United States Patent
Rico et al.

(10) Patent No.: US 11,888,434 B2
(45) Date of Patent: Jan. 30, 2024

(54) DEVICE FOR SUPPORTING SOLAR MODULES, KIT, METHOD FOR MANUFACTURING, AND SOLAR MODULE ARRANGEMENT

(71) Applicant: Mounting Systems GmbH, Rangsdorf (DE)

(72) Inventors: Txaber Vaca Rico, Leioa (ES); Carsten Philippi, Ludwigsfelde (DE)

(73) Assignee: MOUNTING SYSTEMS GMBH, Rangsdorf (DE)

( * ) Notice: Subject to any disclaimer, the term of this patent is extended or adjusted under 35 U.S.C. 154(b) by 0 days.

(21) Appl. No.: 17/488,351

(22) Filed: Sep. 29, 2021

(65) Prior Publication Data

US 2022/0109396 A1 Apr. 7, 2022

(30) Foreign Application Priority Data

Oct. 2, 2020 (EP) .................................... 20199811

(51) Int. Cl.
| | |
|---|---|
| *H02S 20/30* | (2014.01) |
| *F16M 11/20* | (2006.01) |
| *F24S 25/12* | (2018.01) |
| *F24S 25/70* | (2018.01) |

(52) U.S. Cl.
CPC ......... *H02S 20/30* (2014.12); *F16M 11/2007* (2013.01); *F24S 25/12* (2018.05); *F24S 25/70* (2018.05)

(58) Field of Classification Search
None
See application file for complete search history.

(56) References Cited

U.S. PATENT DOCUMENTS

| 4,421,943 | A | * | 12/1983 | Withjack | ................ F24S 25/70 |
| | | | | | 136/246 |
| 5,833,178 | A | * | 11/1998 | Plasse | ................... A47B 97/08 |
| | | | | | 248/447 |
| 8,464,995 | B2 | * | 6/2013 | Yang | ..................... F16M 13/00 |
| | | | | | 248/455 |

(Continued)

FOREIGN PATENT DOCUMENTS

| CN | 109047086 A | 12/2018 |
| CN | 210327452 U | 4/2020 |

(Continued)

*Primary Examiner* — Joshua K Ihezie
(74) *Attorney, Agent, or Firm* — Schmeiser, Olsen & Watts, LLP

(57) ABSTRACT

A device for supporting solar modules is provided, the device having a base rail) and an upper support arranged on the base rail for holding an upper end of a solar module. The upper support has a first support element and a second support element which are movably connected to one another in such a way that the first support element is movable relative to the second support element between a first position and a second position. The upper support extends up to a first height above the base rail when the first support element is arranged in the first position. The upper support extends up to a second height above the base rail, which is different from the first height, when the first support element is arranged in the second position. A kit, a method for manufacturing a device, and a solar module arrangement are also provided.

12 Claims, 17 Drawing Sheets

(56) References Cited

U.S. PATENT DOCUMENTS

| | | | |
|---|---|---|---|
| 9,109,814 B2* | 8/2015 | Patton | H02S 30/10 |
| 9,379,660 B2* | 6/2016 | Al-Haddad | F24S 25/10 |
| 9,657,967 B2* | 5/2017 | Adriani | F24S 25/61 |
| 9,768,724 B2* | 9/2017 | De Vogel | F24S 25/60 |
| 2003/0230451 A1* | 12/2003 | Garrett | B23D 61/12 |
| | | | 182/45 |
| 2008/0105489 A1* | 5/2008 | Garrett | E04G 3/26 |
| | | | 248/237 |
| 2010/0236183 A1* | 9/2010 | Cusson | H02S 20/30 |
| | | | 52/645 |
| 2012/0186169 A1* | 7/2012 | Tomaso | F24S 25/13 |
| | | | 52/173.3 |
| 2012/0298201 A1* | 11/2012 | Stephan | F24S 25/70 |
| | | | 136/259 |
| 2012/0318322 A1* | 12/2012 | Lanyon | F24S 25/70 |
| | | | 136/244 |
| 2013/0037081 A1 | 2/2013 | Grant | |
| 2013/0312812 A1* | 11/2013 | Meyer | F24S 25/50 |
| | | | 136/246 |
| 2015/0171786 A1* | 6/2015 | Worden | F24S 25/636 |
| | | | 136/251 |
| 2017/0133977 A1* | 5/2017 | Tripp | H02S 20/23 |
| 2017/0194902 A1* | 7/2017 | Meine | F24S 25/634 |
| 2018/0062570 A1* | 3/2018 | Murakami | F24S 25/636 |
| 2021/0257962 A1* | 8/2021 | McPheeters | F24S 25/12 |
| 2022/0109396 A1* | 4/2022 | Rico | F16M 11/2007 |
| 2022/0109397 A1* | 4/2022 | Rico | F24S 30/20 |

FOREIGN PATENT DOCUMENTS

| | | |
|---|---|---|
| DE | 10 2006 042 092 A1 | 3/2008 |
| DE | 102009002504 A1 | 10/2010 |
| DE | 10 2012 208107 A1 | 5/2013 |
| EP | 3 300 248 A1 | 3/2018 |
| JP | 578462 U | 1/1982 |
| JP | 2009522473 A | 6/2009 |
| JP | 3156066 U | 12/2009 |
| JP | 2010205764 A | 9/2010 |
| JP | 2010283323 A | 12/2010 |
| JP | 2012097505 A | 5/2012 |
| JP | 3176737 U | 7/2012 |
| JP | 2012133315 A | 7/2012 |
| JP | 2012202030 A | 10/2012 |
| JP | 2012233315 A | 11/2012 |
| JP | 2016186188 A | 10/2016 |
| JP | 2017131029 A | 7/2017 |
| WO | 2012/156038 A1 | 5/2012 |
| WO | 2015/069112 A1 | 5/2015 |
| WO | 2015/110254 A1 | 7/2015 |
| WO | 2019/143701 A1 | 7/2019 |

* cited by examiner

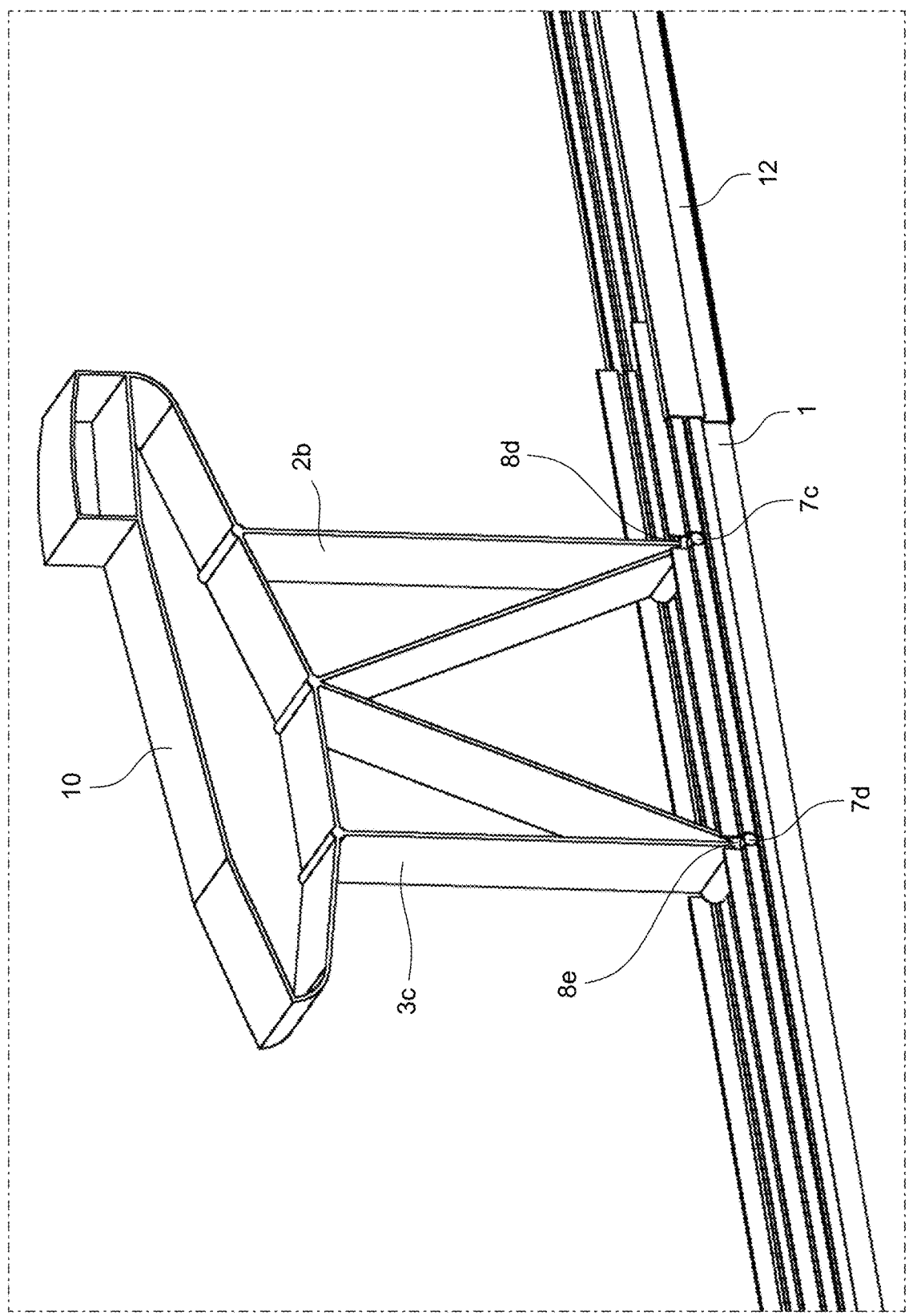

DEVICE FOR SUPPORTING SOLAR MODULES, KIT, METHOD FOR MANUFACTURING, AND SOLAR MODULE ARRANGEMENT

CROSS-REFERENCE TO RELATED APPLICATIONS

This application claims priority to European Application No. 20199811.9, having a filing date of Oct. 2, 2020, the entire contents of which are hereby incorporated by reference.

FIELD OF TECHNOLOGY

The following relates to a device for supporting solar modules, to a kit, and to a method for manufacturing it, as well as to a solar module arrangement.

BACKGROUND

Solar modules, in particular photovoltaic modules and solar thermal collectors may be arranged free-standing or on roofs. In the case of pitched roofs, the roof indicates the orientation of the solar modules. When mounting on a flat roof and when mounting in a free-standing manner, both the orientation according to the cardinal points and the angular position with respect to the horizontal may be adapted to the circumstances, in particular the structural framework conditions, the position of the sun to be expected according to the geographical location, as well as possible shadowing by objects in the surroundings. In this context, arrangements are known in which the solar modules are oriented toward the south, as well as such arrangements in which one part of the solar modules is oriented toward the east and another part of the solar modules is oriented toward the west. Depending on the orientation and geographical location, angles between 10° and 18° with respect to the horizontal are common, although larger or smaller angles may also be implemented.

Mounting systems for setting an angle made of plastic materials having a trough-like basic shape are known, wherein the shape may be open at the bottom or at the top. Embodiments of each system form oblique bearing surfaces that define an angle of inclination of a solar module to be mounted. A system of this type is known, for example, from DE 10 2006 042 092 A1. WO 2012/156038 A1 likewise discloses such a support unit.

According to another approach, frame structures are formed, which each support one side of a solar module. In this case, one end of a holding profile defining the inclination is fastened to a base profile and extends upward therefrom at an angle. The angle is spanned by a support profile, which extends upward from the base profile to the holding profile and is connected to the latter. Thus, a frame in the shape of a triangle is formed.

Alternatively, solar modules may be mounted on supports in the form of feet, with the feet being free-standing or fixed on base rails. The solar module is fastened in this case to two upper feet, which support a higher rear end of the solar module on opposite sides. The solar module extends obliquely downward from these upper supports and is fastened to the base rail at a lower front end, in particular by means of two lower feet or supports which support the front end of the solar module on opposite sides. In contrast to a support over whole stretches extending along the entire solar module on oblique bearing surfaces or bearing struts, a quasi-punctiform mounting is implemented with the small fastening surfaces in systems of this type. The angle of the solar module with respect to the horizontal is determined in this case by the height difference and the spacing between the front (lower) and the rear (upper) support surfaces.

Systems of this type having front and rear feet are described, for example, in WO 2015/069112 A1, WO 2015/110254 A1, and WO 2019/143701 A1. WO 2015/069112 A1 discloses a system in which supports having curved profiles are formed.

Feet may be formed as fold-out profiles connected to a base profile. In order to achieve different angular orientations to the horizontal of solar modules within a modular system, feet may be made up of a plurality of segments which are selected and connected to one another in order to form a foot with a desired height.

SUMMARY

An aspect relates to improved technologies for holding systems for solar modules with which mounting of solar modules is made possible on flat roofs or free-standing at a flexible angular position and with improved manageability.

To achieve the aspect, a device for supporting solar modules is provided. Furthermore, a kit and a method for manufacturing a device for supporting solar modules as well as a solar module arrangement are provided.

According to one aspect, a device for supporting solar modules is provided. The device has a base rail and an upper support having a first support element and a second support element, arranged on the base rail, for holding an upper end of a solar module. The first support element and the second support element are movably connected to one another in such a way that the first support element is movable relative to the second support element between a first position and a second position. When the first support element is arranged in the first position, the upper support extends up to a first height above the base rail. When the first support element is arranged in the second position, the upper support extends up to a second height above the base rail, which is different from the first height.

A height of the upper support above the base rail may, in particular, be defined by a spacing from an upper side of the base rail to an uppermost point of the upper support above the upper side of the base rail, the upper side of the base rail and the uppermost point of the upper support being defined with respect to a horizontal orientation of the base rail on or above a substrate of the device, for example, a floor or a flat roof. In the case of a solar module arranged at an angle to the horizontal, the upper end of the solar module may be defined by the uppermost edge of the solar module, the uppermost edge of the solar module being defined with respect to a horizontal orientation of the base rail on or above a ground of the device.

The base rail may be formed with a profile rail. The base rail may, in particular, be formed with a cut-to-length, for example cut off or sheared off, portion of a metal profile or plastics material profile, in particular a hollow profile.

According to a further aspect, a kit is provided for a device according to the disclosure having a base rail and an upper support for holding an upper end of a solar module. The upper support has a first support element and a second support element, wherein the first support element and the second support element are movably connected to one another in such a way that the first support element is movable relative to the second support element between a first position and a second position. The upper support is configured to be arranged on the base rail for manufacturing a device for supporting solar modules. In this case, first support element is configured to be arranged in the first position in such a way that the upper support element extends up to a first height above the base rail, and to be arranged in the second position in such a way that the upper support element extends up to a second height above the base rail, which is different from the first height.

According to a further aspect, a method for manufacturing a device for supporting solar modules is provided. The method comprises the steps of providing a base rail, of providing an upper support for holding an upper end of a solar module, and of arranging the upper support on the base rail. The upper support has a first support element and a second support element, wherein the first support element and the second support element are movably connected to one another in such a way that the first support element is movable relative to the second support element between a first position and a second position. The first support element is arranged in the first position in such a way that the upper support extends up to a first height above the base rail, or the first support element is arranged in the second position in such a way that the upper support extends up to a second height above the base rail, which is different from the first height.

According to yet another aspect, a solar module arrangement having a support device and a solar module is provided. The support device has a base rail and an upper support arranged on the base rail for holding an upper end of a solar module. The upper support has a first support element and a second support element, wherein the first support element and the second support element are movably connected to one another in such a way that the first support element is movable relative to the second support element between a first position and a second position. The solar module is arranged on the support device, an upper end of the solar module being supported by the upper support. The first support element of the support device is arranged in the first position, wherein the first support element is arranged in the first position relative to the base rail of the support device in such a way that the solar module is arranged at a first angle of inclination with respect to the base rail, or the first support element of the support device is arranged in the second position, wherein the first support element is arranged in the second position relative to the base rail of the support device in such a way that the solar module is arranged at a second angle of inclination, which is different from the first angle of inclination, with respect to the base rail.

In the solar module arrangement, a second angle of inclination different from the first angle of inclination may be achieved, for example, by a spacing between a connection point of the upper support with the solar module and a lower end of the solar module differing between an arrangement of the first support element in the first position and an arrangement of the first support element in the second position and/or by a height of the upper support above the base rail differing between an arrangement of the first support element in the first position and an arrangement of the first support element in the second position.

A solar module within the meaning of the disclosure may, in particular, be a photovoltaic module or a solar thermal collector.

With the support elements of the device, it is possible to form support structures for supporting a solar module. The support elements may, in particular, be formed as cast parts, for example, made of cast metal, i.e., cast aluminum. Alternatively, the support elements may be formed with cut-to-length profiles. In this case, the support elements may be reworked, in particular by deburring.

The base rail may have a first receiving opening and a second receiving opening and the upper support may have a first connecting element arranged on the first support element and a second connecting element arranged on the second support element. In this case, the first connecting element may be arranged in the first receiving opening when the first support element is in the first position and in the second receiving opening when the first support element is in the second position. The first support element may, in particular, be arranged in the first position by introducing the first connecting element into the first receiving opening and the first support element may be arranged in the second position by introducing the first connecting element into the second receiving opening.

The first support element may be brought into the first position and the first connecting element may then be arranged in the first receiving opening. Alternatively, the arranging of the first support element in the first position may take place at least partially at the same time as the arranging of the first connecting element in the first receiving opening. Correspondingly, the first support element may be brought into the second position and the first connecting element may then be arranged in the second receiving opening, or the arranging of the first support element in the second position may take place at least partially at the same time as the arranging of the first connecting element in the second receiving opening.

In alternative embodiments, the first connecting element may be arranged in the first or the second receiving opening before the first support element is arranged in the first or the second position, respectively. In configurations of this type, it may be provided for the second connecting element to be arranged on or at least partially in the base rail after the first connecting element has been arranged in the first or second receiving opening and the first support element has been arranged in the first or second position, respectively.

In exemplary embodiments, the first and/or the second connecting element may be pins or bolts, which may be arranged in openings, in particular receiving openings, in the base rail. Connecting elements may, in general, be provided as separate components, which are arranged and fixed on other components, for example, on a support element. Alternatively, connecting elements may be part of the component, for example, a protrusion of such a component, and may thus be arranged on the relevant component already during the manufacturing process.

In embodiments, the first support element and the second support element may be pivotably connected to one another at a hinge point. The first connecting element may be arranged in the area of an end of the first support element remote from the hinge point and the second connecting element may be arranged in the area of an end of the second support element remote from the hinge point. A triangle may thus be spanned with the hinge point, the first connecting element, and the second connecting element, in such a way that in the case of an arrangement of the first connecting element and the second connecting element on the base rail, the spacing between the first connecting element and the second connecting element determines the height of the hinge point and thus the height of the upper support above the base rail. In this case, with the arrangement of the first support element in the first position and the arrangement of the first connecting element in the first receiving opening, a first spacing between the first connecting element and the second connecting element and thus the first height of the upper support above the base rail may be set, and with the arrangement of the first support element in the second position and the arrangement of the first connecting element in the second receiving opening, a second distance between the first connecting element and the second connecting element and thus the second height of the upper support above the base rail may be set.

The support device may have a securing rail, which is arranged on the base rail, at least partially encompassing the base rail, and is movable along the base rail between a first position and a second position. In this case, the securing rail may at least partially close at least one of the first receiving opening and the second receiving opening in the second position in such a way that a movement of the first connecting element out of the first receiving opening and/or of the second receiving opening is prevented. The securing rail may unblock the first receiving opening and the second receiving opening in the first position in such a way that a movement of the first connecting element out of the first receiving opening and the second receiving opening is made possible.

The securing rail may be formed with a connecting rail, which is configured to connect the base rail to a further base rail of a further device.

It may be provided that the upper support has only one connecting element and the base rail is formed with only one receiving opening configured for receiving the connecting element of the upper support. In configurations of this type, a securing rail may be provided, which is arranged at least partially encompassing the base rail on the base rail and is movable along the base rail between a first position and a second position, the securing rail at least partially closing the receiving opening in the second position in such a way that a movement of the connecting element out of the receiving opening is prevented, and the securing rail unblocking the receiving opening in the first position in such a way that a movement of the connecting element out of the receiving opening is made possible.

The second connecting element may be arranged in a stationary manner in a further receiving opening of the base rail. In this case, a stationary arrangement of the second connecting element within the meaning of the disclosure means that the second connecting element is prevented from being displaced with respect to the base rail, i.e., is not moveable in a translatory manner. A rotation of the second connecting element may thus be made possible in this case.

The device may be provided with a pre-mounted upper support, in which the second connecting element is arranged in a stationary manner in the further receiving opening of the base rail and the first support element, for setting the first height of the upper support, may be arranged in the first receiving opening, wherein the first support element is brought into the first position, and the first support element, for setting the second height of the upper support, may be arranged in the second receiving opening, wherein the first support element is brought into the second position.

In alternative configurations, the base rail may have a first further receiving opening and a second further receiving opening and the second connecting element may be configured to be arranged in the first further receiving opening when the first support element is arranged in the first position and may be configured to be arranged in the second further receiving opening when the first support element is arranged in the second position.

The second connecting element may be arranged in a releasable stationary manner in the further receiving opening or in one or both of the first further receiving opening and the second further receiving opening. For example, the second connecting element may be secured by means of the securing rail. For this purpose, the securing rail may be configured, in the second position and/or in a third position of the securing rail along the base rail, to at least partially close the further receiving opening, or one or both of the first further receiving opening and the second further receiving opening, in such a way that a movement of the second connecting element from the further receiving opening, or from one or both of the first further receiving opening and the second further receiving opening is prevented. In another position, for example the first position and/or the second position, the securing rail may unblock the further receiving opening, or the first further receiving opening and the second further receiving opening, in such a way that a movement of the second connecting element out of the further receiving opening or out of the first further receiving opening and the second further receiving opening is made possible.

The upper support may be arranged in a first holding position in which the upper support is configured to hold a solar module at a first angle relative to the base rail, and in a second holding position in which the upper support is configured to hold a solar module at a second angle relative to the base rail, which is different from the first angle.

The upper support may be arranged in the first holding position when the first support element is arranged in the first position, and the upper support may be arranged in the second holding position when the first support element is arranged in the second position.

The upper support may comprise a holding device, which is configured to hold a solar module at a fixed angle to the holding device, for example, parallel to a bearing or support surface of the holding device, and which is arranged at a first angle of the holding device relative to the base rail, when the first support element is arranged in the first position, and is arranged at a second angle of the holding device relative to the base rail when the first support element is arranged in the second position. In configurations having a pivotable connection of the first support element and of the second support element at a hinge point, the holding device may have a bearing surface or support surface arranged above the hinge point and a clamping element, which is configured to fix a solar module relative to the support surface.

In alternative embodiments, the upper support may have a holding device, which is configured to hold a solar module at a variable angle. In this case, the height of the upper support, in particular a choice between the first height and the second height by means of an arrangement of the first support element in the first position or the second position, may determine an angle of a solar module to be held relative to the base rail, in particular, a first angle associated with the first height and a second angle associated with the second height, which is different from the first angle.

In exemplary embodiments, a first angle of a solar module to be arranged on the device may be approximately 10 degrees relative to the base rail and a second angle of the solar module relative to the base rail may be approximately 15 degrees. In alternative embodiments, the first angle may be 5 degrees and the second angle may be 7 degrees.

The first support element may be fixable, or releasably fixable, respectively in the first position and in the second position with respect to the second support element. For example, a respective latching connection may be provided between the first support element and the second support element in the first position and in the second position. In this case, a resilient or resiliently movable projection on one of the support elements may engage in an opening corresponding to the first position or in an opening corresponding to the second position in the other support element. Alternatively, a resilient or resiliently movable projection corresponding to the first position or a resilient or resiliently movable projection corresponding to the second position on one of the support elements may engage in an opening of the other support element. A resilient or resiliently movable projection may be formed, for example, with a flexible nose, a pressure piece, or a spring pin. Alternatively, a releasable connection may be formed with a pin, which is arranged in corresponding openings in the first and/or the second support element. As a further alternative, the support elements may be fixable relative to one another by being fixed to a further element, for example to a connecting element of the upper support, with which the first support element and the second support element are connected.

It may be provided, in particular, to fix the first support element in the first position or in the second position with respect to the second support element without tools, i.e., without a user of the device requiring a tool to achieve the fixation. Alternatively, the first support element may be releasably or non-releasably fixed in the first position or in the second position with respect to the second support element using a tool, for example by screwing, riveting, gluing, or welding.

The first support element may be movable relative to the second support element into a transport position of the first support element and the second support element may be movable relative to the base rail into a transport position of the second support element. Thereby, the upper support may be arranged substantially within the base rail when the first support element and the second support element are arranged in the respective transport position. Thus, the upper support may be configured to be folded in from an erected position in which the upper support is configured for supporting a solar module and the first support element is arranged in the first or the second position by moving the first and the second support elements into the respective transport position. In this way, the device may be prepared for transport. An arrangement substantially within the base rail is achieved within the meaning of the disclosure when the overall cross-sectional profile of the base rail is not substantially increased by the additional elements. A transport of the device may, in particular, be made possible, which transport does not differ in terms of space requirements and manageability from a transport of only the base rail itself, except for a transported mass, or which is significantly less increased than if the first support element were arranged in the first position or in the second position.

In configurations in which the device is formed with a securing rail, the securing rail may be configured to secure the first support element in the transport position. For this purpose, the securing rail may, for example, have gaps or protrusions formed with a spacing, which may be moved by moving the securing rail along the base rail over the connecting element or the connecting elements of the first support element arranged in the transport position, and in this way restrict or prevent a movement of the first support element.

The device may have a lower support arranged on the base rail for holding a lower end of a solar module. The lower support may be configured to hold a lower end of a solar module at different angles of the solar module with respect to the base rail. Alternatively, the lower support may be configured to hold a lower end of a solar module at an angle of the solar module with respect to the base rail, the lower support being adjustable and/or being intended to be arranged on the base rail for different angles of the solar module. With the lower support and the upper support, the device may be configured to form a holding system for solar modules with high and low feet.

The upper support may have a deflector holder, which is configured to hold a wind deflector on the upper support in such a way that the wind deflector is arranged at a first deflector angle relative to the base rail when the first support element is arranged in the first position, and the wind deflector is arranged at a second deflector angle relative to the base rail when the first support element is arranged in the second position. A wind deflector may represent a barrier, which prevents wind from entering under a solar module arranged on the device, in particular a planar barrier. For example, a wind deflector may be formed with a metal sheet, which is configured to be arranged in front of an opening in the device or in the solar module arrangement in order to prevent wind from entering through the opening. By means of the deflector holder, the device may be configured to receive a wind deflector in such a way that the wind deflector may be used for the device and/or the solar module arrangement, both when the first support element is arranged in the first position and when the first support element is arranged in the second position.

Independently from the device, a deflector holder is provided according to the present disclosure, which is configured to hold a wind deflector on an upper support of a holding system for solar modules, on a solar module arrangement, or on a device for supporting solar modules in such a way that the wind deflector is arranged at a first deflector angle relative to a base rail of the system, to the device or to the solar module arrangement, when the upper support extends up to a first height above the base rail, and the wind deflector is arranged at a second deflector angle relative to the base rail, when the upper support extends up to a second height above the base rail, which is different from the first height. In this case, the upper support may be selected from a plurality of upper supports having different heights. Alternatively, the upper support may be height-adjustable.

The deflector holder may have a convex support surface, in particular a convex support surface extending along an arc of a circle. The wind deflector may have a concave contact surface which is configured to the convex support surface and which rests on the convex support surface of the deflector holder. The concave contact surface may, in particular, extend along an arc of a circle having a diameter which is equal to the diameter of the arc along which the convex support surface extends. The wind deflector may be rotatable relative to the deflector holder in such a way that, during a rotation of the wind deflector relative to the deflector holder, contact continues to exist between the concave contact surface on the convex support surface. The wind deflector may thus be rotatable relative to the deflector holder, while the wind deflector rests on the deflector holder. In this way, a deflector angle may be continuously adjusted. When the contact surface rests on the support surface, a deflector angle may be set automatically by a height of the deflector holder above the base rail if an end of the wind deflector opposite the contact surface is arranged on the base rail or in the area of the base rail. The wind deflector may be fixable, or releasably fixable, to the deflector holder in a first position, in which the wind deflector is arranged at a first deflector angle to the base rail, and/or in a second position, in which the wind deflector is arranged at a second deflector angle to the base rail. The wind deflector may, in particular, be fixable to the deflector holder without tools, for example, by means of latching elements such as resilient noses, pressure pieces, or spring pins that engage in corresponding openings, or by means of connecting elements usable without tools, for example, pins or wing screws insertable by hand. Alternatively, or in addition, the wind deflector may be fixable to the deflector holder by means of a tool, for example by screwing, riveting, gluing, or welding.

The base rail may be configured to receive and to route a cable of a solar module. For this purpose, the base rail may have one or a plurality of cable receiving devices. Cable receiving devices may, for example, be formed with channels for routing cables, in particular, along the course of the base rail. By receiving and routing the cable in the base rail, in particular in one or a plurality of cable receiving devices, the cable may be protected from damage, in particular, against damage from sharp edges of the base rail or of other components of the device. As a result, cables may be laid quickly and safely even when profile rails cut to length are used in the device. The base rail may be configured to receive and route a plurality of cables.

One or a plurality of cable receiving devices may be formed with the base rail itself. A profile forming the base rail may, in particular, be designed in such a way that it allows cable routing. For example, the base rail may have the shape of a cable duct. The spacing between an inner rail base and other overlying elements such as pins or supports may be dimensioned so that a connector, in particular a connector corresponding to a corresponding standard, of a cable of a solar module may be moved through a free space formed with the spacing. The base rail may be configured to receive a plurality of cables. The base rail may, in particular, be dimensioned for receiving a plurality of cables.

In addition to a structural function in the device, the base rail may thus also assume the function of a cable duct. As a result, the need to provide additional devices for cable routing may be eliminated. A reduction in costs may thus be achieved, in particular by reducing production costs, logistics, and mounting costs.

Furthermore, a securing rail and/or a connecting rail, in particular a securing rail formed with a connecting rail, may be configured to receive and route a cable of a solar module. The statements set out above regarding the configuration of the base rail for receiving and routing a cable of a solar module may in this case be provided accordingly.

The disclosure provides, independently from the remaining configuration of the device, a base rail for a holding system for solar modules for a solar module arrangement, or for a device for supporting solar modules which is configured to receive and route a cable of a solar module. In this case, the above statements regarding the configuration of the base rail of the device for receiving and routing a cable apply accordingly.

The base rail may be configured for arranging one side of a ballast holding device thereon in such a way that the ballast holding device rests at least in sections on the base rail, and the upper support may be configured to be arranged at least in sections in at least one opening of the ballast holding device when the latter rests at least in sections on the base rail, the upper support being shaped in such a way that in this case it substantially prevents an upward movement of the ballast holding device. With the shaping of the upper support, a positive fit between the upper support and the ballast holding device is established in an upward direction of movement of the ballast holding device, at least to the extent that an upward movement of the ballast holding device is prevented. The shaping of the upper support may be such that it is unable to prevent the movement of the ballast device in other directions. Alternatively, the shaping of the upper support may also prevent the movement of the ballast device in other directions. An upward movement of the ballast holding device is substantially prevented if the ballast holding device is unable to move so far upward that it may be removed from the base rail, in particular due to the action of the wind. A slight play in the form of a movement of the ballast holding device relative to the base rail, which does not impair the securing of the position of the ballast holding device on the base rail, may be possible in this case.

Arranging the upper support at least in sections in at least one opening of the ballast holding device may, in particular, comprise arranging the first and/or the second support element in the opening or in different openings of the ballast holding device.

A shaping of the upper support may substantially prevent an upward movement of the ballast holding device by providing an enlarged profile of the upper support above the ballast device. Alternatively, or in addition, the upper support above the ballast holding device may not extend straight upward. For example, the upper support may extend obliquely at least above the ballast holding device, so that an upward movement of the ballast holding device is substantially prevented at least if at the same time a forward and/or backward movement of the ballast holding device in the direction of extension of the base rail is prevented, so that the ballast holding device is unable to follow the course of the upper support.

The ballast holding device may be a ballast trough or ballast rail, which has a recess for receiving ballast and a bearing edge which is configured to be arranged on the base rail. The at least one opening of the ballast holding device may be formed with a cutout in the bearing edge which opens to a lateral edge of the ballast holding device. The cutout may encompass the upper support. In this case, edges of the cutout in the direction of extension of the base rail may rest against the upper support at the front and rear, so that a forward and backward movement of the ballast holding device is substantially prevented.

The disclosure provides a device for supporting solar modules, having a base rail, an upper support arranged on the base rail for holding an upper end of a solar module, and a ballast device for receiving ballast, one side of the ballast holding device being arranged on the base rail in such a way that the ballast holding device rests at least in sections on the base rail, and the upper support is arranged at least in sections in at least one opening of the ballast holding device, the upper support being shaped in such a way that an upward movement of the ballast holding device is substantially prevented in this case. In connection with such a device, the above statements regarding the ballast holding device and the arrangement thereof in a device for supporting solar modules, in which the upper support has a first support element and a second support element, apply accordingly.

The upper support may have a plurality of first connecting elements. For example, the upper support may have two first connecting elements arranged on the first support element, which are designed, for example, separately as pins or as protrusions of the first support element and extend away from the first support element in opposite directions transversely to a direction of extension of the base rail. In this case, the first receiving opening and the second receiving opening may extend through opposite walls of the base rail, so that the two first connecting elements come to rest each on one wall of the base rail when the first connecting elements are arranged in the first receiving opening or the second receiving opening, and thus support the first support element on both sides of the base rail. Alternatively, or in addition, the upper support may have a plurality of second connecting elements, in which case the designs implemented in connection with multiple first connecting elements may be provided accordingly.

Receiving openings in the base rail may, in particular, be open to an upper side of the base rail. For example, receiving openings may be designed as upwardly open gaps in the base rail, which extend over the entire width of the base rail, and into which connecting elements extending transversely to a direction of extension of the base rail may be inserted from above. Alternatively, receiving openings having laterally limited openings may be formed in an upper side of the base rail, for example, with bores in the upper side of the base rail. In configurations of this type, for example, vertically extending connecting elements, for example vertically arranged pins, may be inserted or plugged into the receiving openings from above. As a further alternative, receiving openings open to one side of the base rail may be provided, which may be designed analogously to the embodiments having upwardly open receiving openings, and into which corresponding connecting elements of the upper support may be introduced from the relevant side of the base rail.

The first support element and the second support element may be designed identically and connected to one another to form the upper support. For example, the first support element and the second support element may have the same shape and may be arranged rotated relative to one another by an angle of 180 degrees about a longitudinal axis and connected to one another, for example, at a hinge point.

Further positions may, in general, be provided in addition to the first and the second position of a first support element. In particular, in connection with the device for supporting solar modules, further heights of the upper support above the base rail may be adjustable in this case. In connection with the arrangement, further angles of inclination of the solar module with respect to the base rail may be provided. In this case, the number of further elements and possible positions thereof may be adapted accordingly. For example, additional receiving openings may be provided.

The solar module arrangement may have a plurality of support devices. In a configuration having two support devices, a first support device and a second support device may be arranged and oriented relative to one another in such a way that the base rail of the first support device and the base rail of the second support device extend substantially parallel, and the upper support of the first support device is arranged directly opposite the upper support of the second support device. The solar module may be arranged in this case with a first side on the first support device, an upper end of the solar module being held in the area of the first side by the upper support of the first support device. With a second side opposite the first side, the solar module may be arranged on the second support device, the upper end of the solar module being held in the area of the second side by the upper support of the second support device. The respective first support elements of the first and of the second support device are either each arranged in the first position, wherein both first support elements are arranged opposite the respective base rail in such a way that the solar module is arranged at the first angle of inclination with respect to the base rails, or the respective first support elements of the first and the second support device are arranged in the respective second position, wherein the two first support elements are arranged opposite the respective base rail in such a way that the solar module is arranged at the second angle of inclination with respect to the base rails.

The solar module arrangement may have a third support device which, for example, is arranged between the first and the second support device with a base rail oriented parallel to the base rails of the first and second support device, and which supports the solar module centrally. The solar module arrangement may furthermore have any number of further support devices.

A substantially parallel course of base rails of different support devices means a parallel course of the base rails within the scope of the usual mounting tolerances when mounting solar modules. An arrangement of the upper support of the first support device directly opposite the upper support of the second support device may, in particular, mean that a straight line extending perpendicular to the base rails of the first and the second support devices through a point of the upper support of the first support device also extends through the same point of the upper support of the second support device or extends at only a small distance from this point. The substantially parallel arrangement of base rails and arrangement of supports directly opposite one another is fulfilled, in particular, if an arrangement of a multitude of solar modules next to and along base rails one behind the other is made possible without interferences, for example collisions or overlaps, occurring between the respective frames of the solar modules.

Two solar modules may be arranged next to one another in a solar module arrangement, one solar module being arranged with a first side on a support device and a further solar module being arranged with a second side on the same support device. The respective other side of the solar modules in this case may be arranged on a respective further support device, which may form a lateral end of the solar module arrangement or on which in turn a respective side of further solar modules may be arranged.

Two solar modules may be arranged one behind the other in a solar module arrangement, in which case the inclination of the solar modules may be sloping in the same or in opposite directions. In the case of an equally oriented inclination, a respective upper end of the solar modules may be held by a respective upper support. If the solar modules are inclined in opposite directions, a respective upper end of both solar modules may be held by the same upper support.

In a solar module arrangement, an arrangement of solar modules may be provided both next to one another and one behind the other, it being possible for the embodiments of such arrangements described above to be provided accordingly. In an arrangement of two solar modules next to one another and two further solar modules one behind the other with opposite inclination, the four solar modules may be held by the same upper support, in particular, in a respective corner area of each.

A support device of the solar module arrangement may be a device for supporting solar modules according to the disclosure. A support device, in particular a device for supporting solar modules according to the disclosure, may be configured to hold a respective upper end of each of up to four solar modules in the area of one side. For this purpose, the upper support of the support device may have one or a plurality of stop elements against which solar modules, in particular frame profiles of solar modules, may be placed for mounting on the support device. A stop for a respective upper edge and/or for a respective side edge of each of four solar modules may, in particular, be formed with the one or the plurality of stop elements. Alternatively, or in addition, the upper support of the support device may have fastening elements, for example clamping elements and/or screw elements, for respectively fastening a respective upper end of up to four solar modules.

With regard to the kit, the method for manufacturing a device for supporting solar modules and/or the solar module arrangement, the configurations described in connection with the device for supporting solar modules may be provided accordingly, and vice versa.

A wind deflector and/or a ballast holding device may, in particular, be provided in the solar module arrangement, which is arranged with a first side on the first device and with a second side opposite the first side on the second device, wherein, in connection with the wind deflector and/or with the ballast holding device, the configurations described in connection with the device may be provided accordingly for the support device or for the support devices respectively in relation to one side of the wind deflector and/or the ballast holding device. Alternatively, or in addition, it may be provided that at least one base rail of the support device or of the support devices is configured in accordance with the described configurations to receive and route one or a plurality of cables of a solar module.

Alternatively, or in addition to the exemplary embodiments described the support device in one embodiment may be formed with a water drainage system in the area of the base rail and of the securing rail. For this purpose, drainage grooves may be provided in the bottom area of the base rail, which extend in the longitudinal direction of the base rail and serve to drain water, in particular rainwater. If cables are inserted in the base rail, this prevents the cables from lying in the water. The water that runs off or is drained from the base rail via the drainage grooves may then reach the securing rail underneath and may be drained to the outside along recesses formed on the securing rail in the bottom area. Drainage channels are formed by means of the recesses and the base of the securing rail arranged there above.

In a further embodiment, it may be provided as an alternative or in addition to the exemplary embodiments described, that the lower support is formed with a support component pivotably mounted on the base rail. The support or holding component provides a support surface on which the solar module is to be placed, wherein a spacer pin may be arranged on support surfaces formed next to one another, with which a stop is formed for the solar modules to be arranged on both sides. The holding component is mounted on the base rail so as to be pivotable about a pivot axis, which extends transversely to the longitudinal direction of the base rail. Holding claws may grasp the base rail on opposite sides and at a distance from the base rail, so that a shear rail or securing rail may be pushed into the spacing area between the base rail and the holding claw. If the holding component is pivoted about the pivot axis, the holding claws may be released from engagement (by pivoting upwards). The pivotable mounting of the holding component allows for a continuous adjustment to different angles of inclination of the solar module.

BRIEF DESCRIPTION

Some of the embodiments will be described in detail, with references to the following Figures, wherein like designations denote like members, wherein:

FIG. 4B shows another device for supporting solar modules having a high upper support;

DETAILED DESCRIPTION

Figure 1:
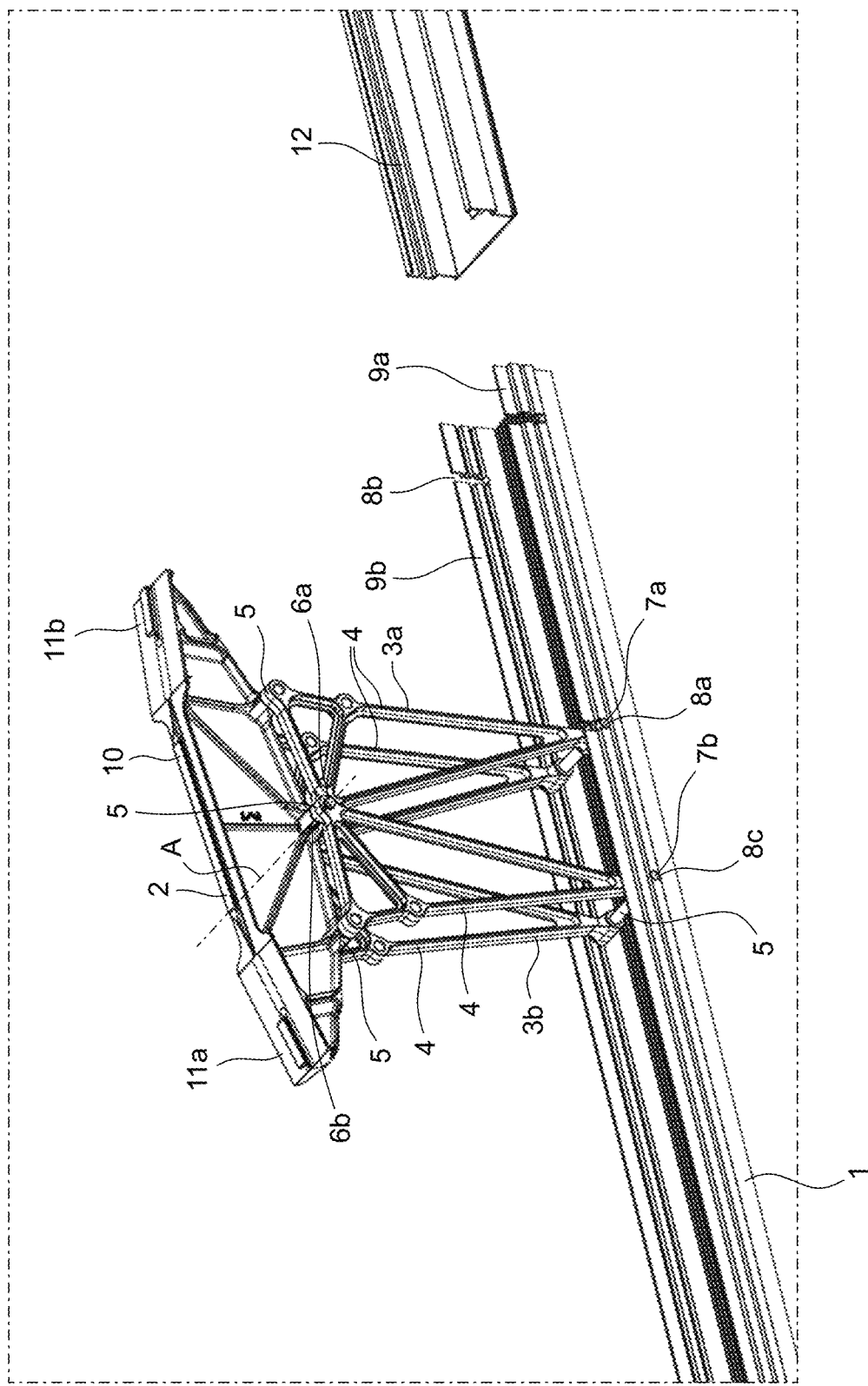
FIG. 1 shows a device for supporting solar modules in an unsecured configuration.

FIG. 1 shows a device for supporting solar modules. The device is formed with a base rail 1. An upper support 2, which is used to hold an upper end of a solar module on one side of the solar module, is arranged on the base rail 1.

The upper support 2 is height-adjustable. For this purpose, the support is formed with two support elements 3a, 3b. In the exemplary embodiment in FIG. 1, each of the support elements 3a, 3b is formed with two cast metal parts 4, which are connected to one another by cylindrical pins 5. In the embodiment shown, the four cast metal parts 4 are structurally identical.

The support elements 3a, 3b are connected to one another by means of a cylindrical pin 5 at two hinge points 6a, 6b situated on a hinge axis A, allowing a rotation about the hinge axis A. As a result, the support elements 3a, 3b may be pivoted relative to one another. At a respective lower end of the support elements 3a, 3b, the cylindrical pins 5 are each formed with two connecting elements 7a, 7b, which protrude laterally from the support elements 3a, 3b.

The connecting elements 7a, 7b may be arranged in receiving openings 8a, 8b, 8c of the base rail 1. In this case, a first receiving opening 8a and a second receiving opening 8b of the base rail, which form one elongated hole shape each in opposite side walls 9a, 9b of the base rail 1, are each formed as a gap that penetrates the base rail 1 over the entire width thereof and is open to an upper side of the base rail. The connecting elements 7a of a first support element 3a may be inserted from above into the first receiving opening 8a or into the second receiving opening 8b. The respective position of the lower end of the first support element 3a along the course of the base rail 3 is thereby defined. In the device according to FIG. 1, the first connecting elements 7a are arranged in the first receiving opening 8a.

A further receiving opening 8c of the base rail 1 is formed as a gap having a circular cross section, which gap penetrates the entire width of the base rail 1 and forms circular bores in the opposite side walls 9a, 9b of the base rail 1. The connecting elements 7b of a second support element 3b are rotatably arranged in the further receiving opening 8c. In the embodiment shown, the connecting elements 7b of the second support element 3b are formed as pin ends arranged in, and protruding from, the relevant cylindrical pin 5, which engage into the further receiving opening 8c and which fix the lower end of the second support element 3b in a stationary manner along the direction of extension of the base rail 1.

Figure 2:
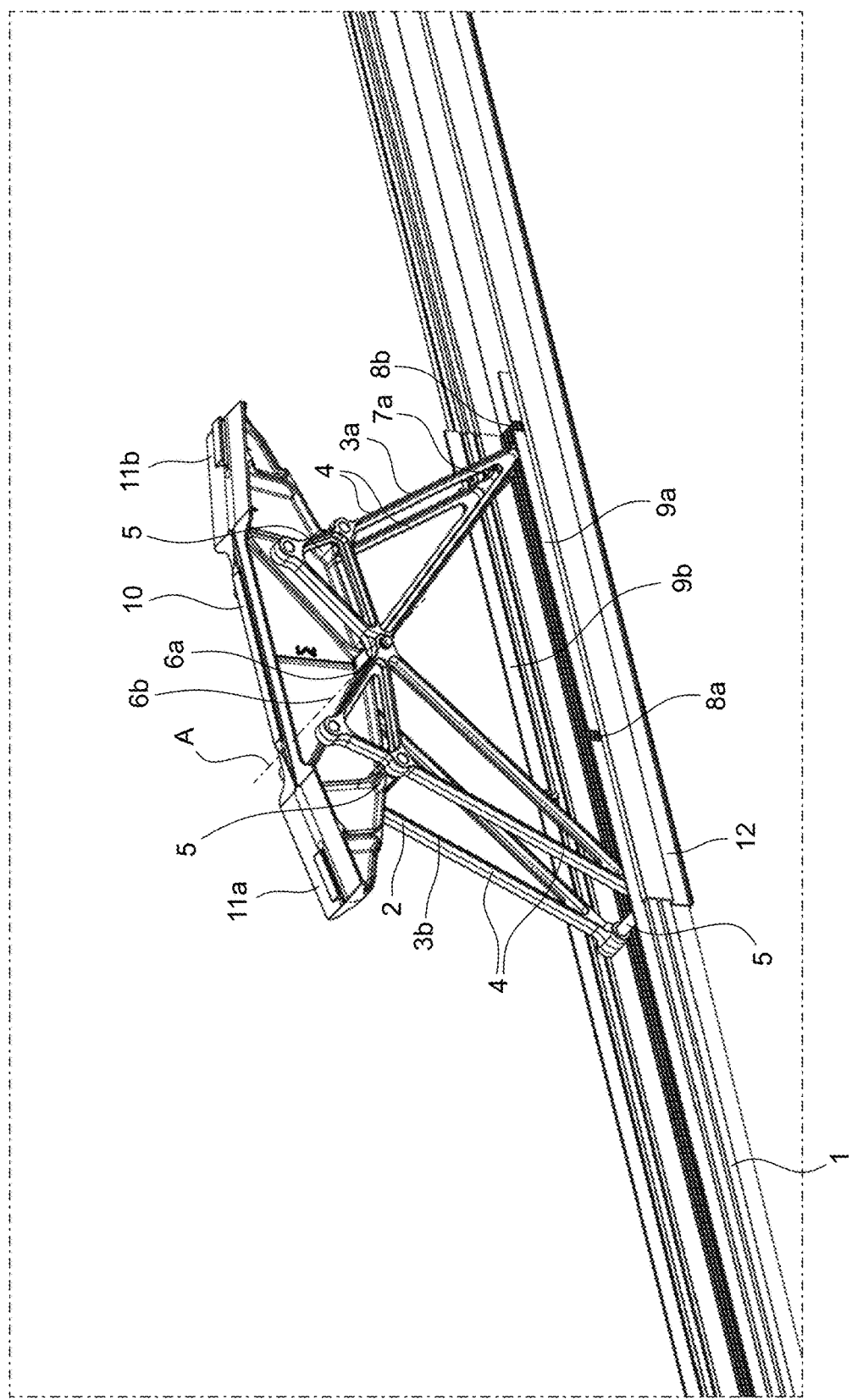
FIG. 2 shows another device for supporting solar modules in a secured configuration.

FIG. 2 shows a device for supporting solar modules, in which, compared to the configuration in FIG. 1, the connecting elements 7a of the first support element 3a are arranged in the second receiving opening 8b of the base rail 1. As a result, the first support element 3a and the second support element 3b are pivoted with respect to the configuration shown in FIG. 1 and a distance between the lower ends of the first support element 3a and the second support element 3b, which is determined by the spacing between the first connecting elements 7a and the second connecting elements 7b, is increased. The height of each triangle above the base rail 1, which is formed by the first connecting elements 7a, the second connecting elements 7b, and the hinge points 6a, 6b, is thus reduced. This results in a lower overall height of the upper support of the configuration of FIG. 2 compared to the upper support of the configuration shown in FIG. 1. In addition, a support point for a solar module shifts relative to the base rail 1. As a result, for a solar module the upper end of which is held on the respective upper support 2 and the lower end of which is at the height of the respective base rail 1, a different angle with respect to the horizontal is achieved between the configurations of FIGS. 1 and 2.

When comparing the representations in FIGS. 1 and 2, it is apparent that, depending on the arrangement of the first connecting elements 7a in the first 8a or second 8b receiving opening, the cylindrical pins 5 arranged along the course of the base rail 1 in front of and behind the hinge points 6a, 6b come into contact with different openings of the cast metal parts 4 of the first 3a and second 3b support element. In this case, the relevant pins 5 are secured in the corresponding openings for additional stabilization of the upper support 2.

The upper support 2 has a holding device 10 which, for holding a respective solar module, has two support surfaces 11a, 11b on which one or a plurality of solar modules may be placed and fixed. The support surfaces 11a, 11b are arranged at an angle to a central section of the holding device 10 in order to support a solar module at an angle to the horizontal. Stops are formed on each of the support surfaces 11a, 11b, against which solar modules to be arranged on the holding device 10 may be placed laterally in order to orient them, in particular with respect to a frame structure of the solar modules. It is therefore apparent that in the embodiment shown, the holding device 10 is configured to hold four solar modules, namely two solar modules each arranged laterally next to one another on each of the bearing surfaces 11a, 11b.

As may be seen in the comparison of FIGS. 1 and 2, the first receiving opening 8a and the second receiving opening 8b have different depths from the top of the base rail 1. As a result, the first connecting elements 7a and the second connecting elements 7b are arranged at the same height when the first connecting elements 7a are arranged in the second receiving opening 8b, as shown in FIG. 2. If the first connecting elements 7a are arranged in the first receiving opening 8a, the first connecting elements 7a are situated higher than the second connecting elements 7b. As a result, the holding device in the configuration according to FIG. 1 is angled with respect to a horizontal orientation of the middle section, which is set in the configuration according to FIG. 2. A different angle with respect to the horizontal of the support surface 11a in the different configurations is thereby achieved. In the exemplary configuration of FIG. 1, an angle of the support surface 11a with respect to the horizontal, and thus the angle with respect to the horizontal at which a solar module is arranged flat on the support surface 11a, is 15 degrees. According to the exemplary embodiment in FIG. 2, the angle of the support surface 11a with respect to the horizontal, and thus the bearing angle of a solar module, is 10 degrees.

The cylindrical pin 5 arranged on the hinge axis A and the cylindrical pins 5 arranged along the course of the base rail 1 in front of and behind the hinge points 6a, 6b are arranged in openings of the holding device 10 adapted for this purpose. As a result, by securing the cylindrical pins 5 arranged in front of and behind the hinge points 6a, 6b along the course of the base rail 1 in the corresponding openings of the cast metal parts 4 in the various positions of the support elements 3a, 3b, a securing of the position and orientation of the holding device 10 may additionally be achieved.

In the configuration shown, the second connecting elements 7b are pre-mounted in a fixed position in the further receiving opening 8c in the delivery state of the device. In order to prepare the device for supporting a solar module, the first connecting elements 7a are arranged in the first 8a or the second 8b receiving opening. In the embodiment shown, securing the cylindrical pins 5 arranged in front of and behind the hinge points 6a, 6b takes place in the corresponding openings of the cast metal parts 4 only after the first connecting elements 7a have been arranged in the first 8a or the second 8b receiving opening, since it is necessary during the arrangement of the first connecting elements 7a in the first 8a or the second 8b receiving opening for the support elements 3a, 3b to be movable relative to one another.

A securing rail 12 is shown in FIG. 1 behind the base rail 1 along the course of the base rail 1. The securing rail 12 is formed with a connecting rail, which is configured to connect a plurality of arrangements one behind the other. The securing rail 12 is formed with a profile which is adapted to the outer shape of the base rail 1 in such a way that the securing rail 12 encompasses the base rail 1 from below, partially covering the side walls 9a, 9b of the base rail 1. For this purpose, the securing rail 12 is pushed onto the base rail 1. This is shown in FIG. 2.

The securing rail 12, when it is pushed onto the base rail 1, partially covers and closes the first 8a and second 8b receiving openings. In this case, a first position (not shown) of the securing rail 12 is defined, in which the securing rail is partially pushed onto the base rail 1, does not yet cover, and does not yet close the first 8a and second 8b receiving openings. In a second position of the securing rail 12 shown in FIG. 2, the latter is pushed so far onto the base rail 1 that it partially covers and closes the first 8a and the second 8b receiving opening. As a result, the first connecting elements 7a are prevented from moving out of the receiving opening 8a, 8b in which they are arranged (i.e., from the second receiving opening 8b in the embodiment of FIG. 2). As a result, a securing of the upper support, in particular the first support element 3a, in a desired position is achieved.

On the inside of the securing rail 12, respective projections are formed so that the securing rail 12 may encompass and secure the connecting elements 7a both in the higher arrangement in the first receiving opening 8a and in the lower arrangement in the second receiving opening 8b.

The securing rail 12 may be locked in the second position. For example, latching elements may be provided between the base rail 1 and the securing rail 12, on which the securing rail 12 is secured in the second position in a latching manner. For example, the first 7a and/or the second 7b connecting elements may be formed with resilient or resiliently movable pin elements, which engage for securing purposes in corresponding gaps on the inside of the securing rail 12. Alternatively, the securing rail 12 may be secured to the base rail 1 in the second position, for example by means of pins to be inserted, by screwing, gluing, or welding.

Figure 3:
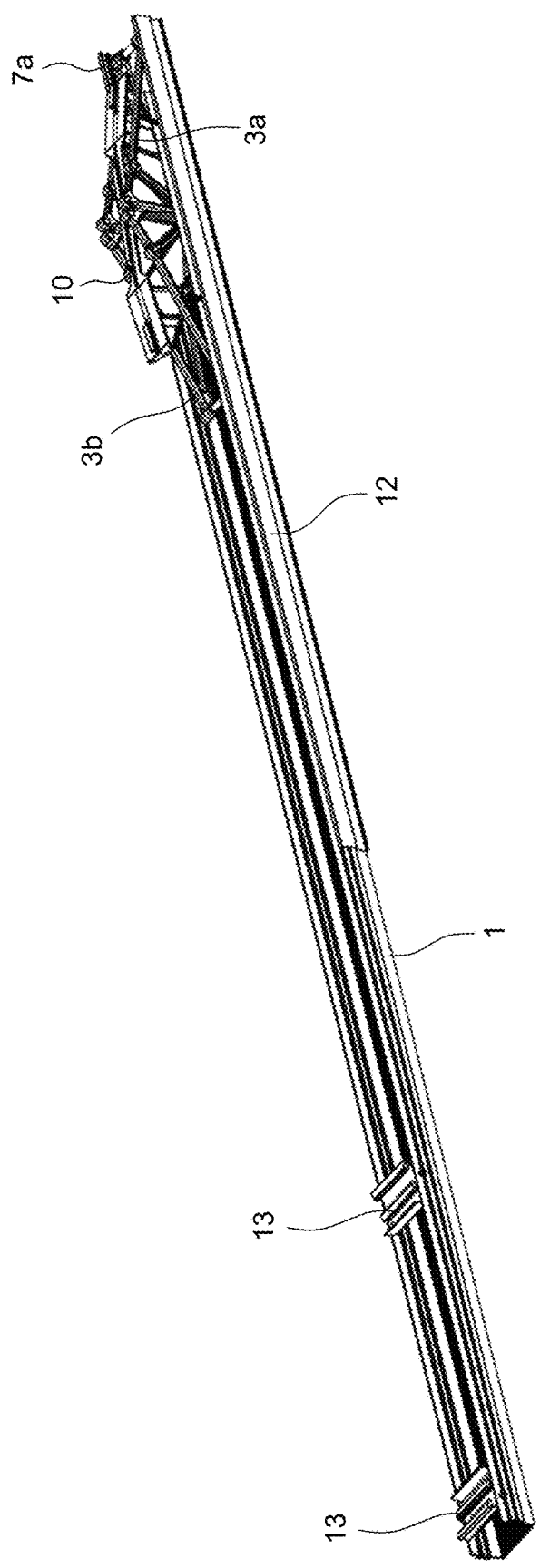
FIG. 3 shows yet another device for supporting solar modules in a transport configuration.

FIG. 3 shows an arrangement for a holding system for solar modules in a transport configuration. In this case, the first connecting elements 7a are moved completely backward, as a result of which the first support element 3a is arranged relative to the second support element 3b in such a way that the upper support 2 is completely collapsed. In this case, the support elements 3a, 3b are arranged substantially within the base rail 1. The support elements 3a, 3b and the holding device 10 still in fact protrude upward beyond the profile of the base rail. Nevertheless, a significantly more compact structure is achieved, as a result of which a transport of the arrangement in the transport configuration may be facilitated. The connecting rail forming the securing rail 12 is arranged almost completely above the base rail 1 in the transport configuration. In this case, the first connecting elements 7a are arranged outside, namely behind, the base rail 1 and are encompassed by a section of the securing rail 12 protruding beyond the base rail 1. As a result, the connecting elements 7a and thus the upper support 2 are secured in the transport configuration. In addition, lower supports 13 are arranged on the base rail 1, each of which is configured to hold a lower end of a solar module.

Figure 4A:
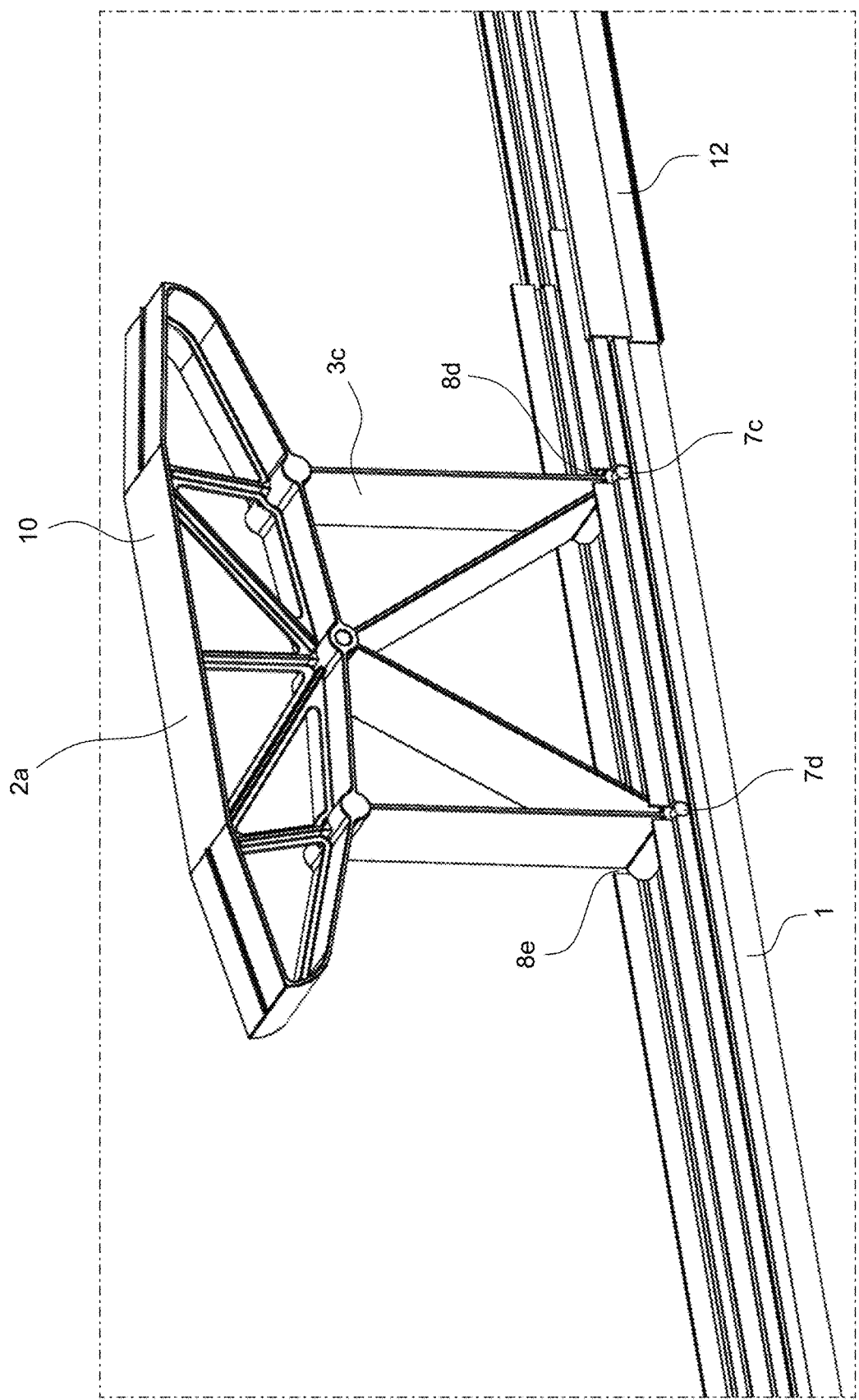
FIG. 4A shows a device for supporting solar modules having a low upper support.

FIGS. 4A and 4B show devices for supporting solar modules, in which a securing rail 12 is used for securing upper supports that are not height-adjustable. According to the representation in FIG. 4A, an upper support 2a with a first height is arranged on a base rail 1. For this purpose, the base rail 1 has two receiving openings 8d, 8e. The upper support 2a is formed with a support structure 3c, which, at the lower end thereof, has connecting elements 7c, 7d at its front and rear along the direction of extension of the base rail 1, which are arranged in the receiving openings 8d, 8e. For this purpose, receiving openings 8d, 8e of the base rail 1 are open at the top. A securing rail 12 may be pushed onto the base rail 1 so that it partially covers and closes the receiving openings 8d, 8e and thus secures the connecting elements 7c, 7d and consequently the upper support 2a-analogous to the statements relating to the embodiments in FIGS. 1 and 2. In comparison to FIG. 4A, in the embodiment according to FIG. 4B, an upper support 2b which is higher than the upper support 2a according to the embodiment of FIG. 4A is arranged on the base rail 1.

Each upper support 2a, 2b may thus be secured to the base rail 1 with the securing rail 12 when mounting the respective device according to FIGS. 4A and 4B, by moving the securing rail 12 into the second position. In addition, an exchange of upper supports is enabled by moving the securing rail 12 into the first position, removing the upper support arranged on the base rail 1, arranging the desired upper support on the base rail 1 and moving the securing rail 12 into the second position.

Figure 5:
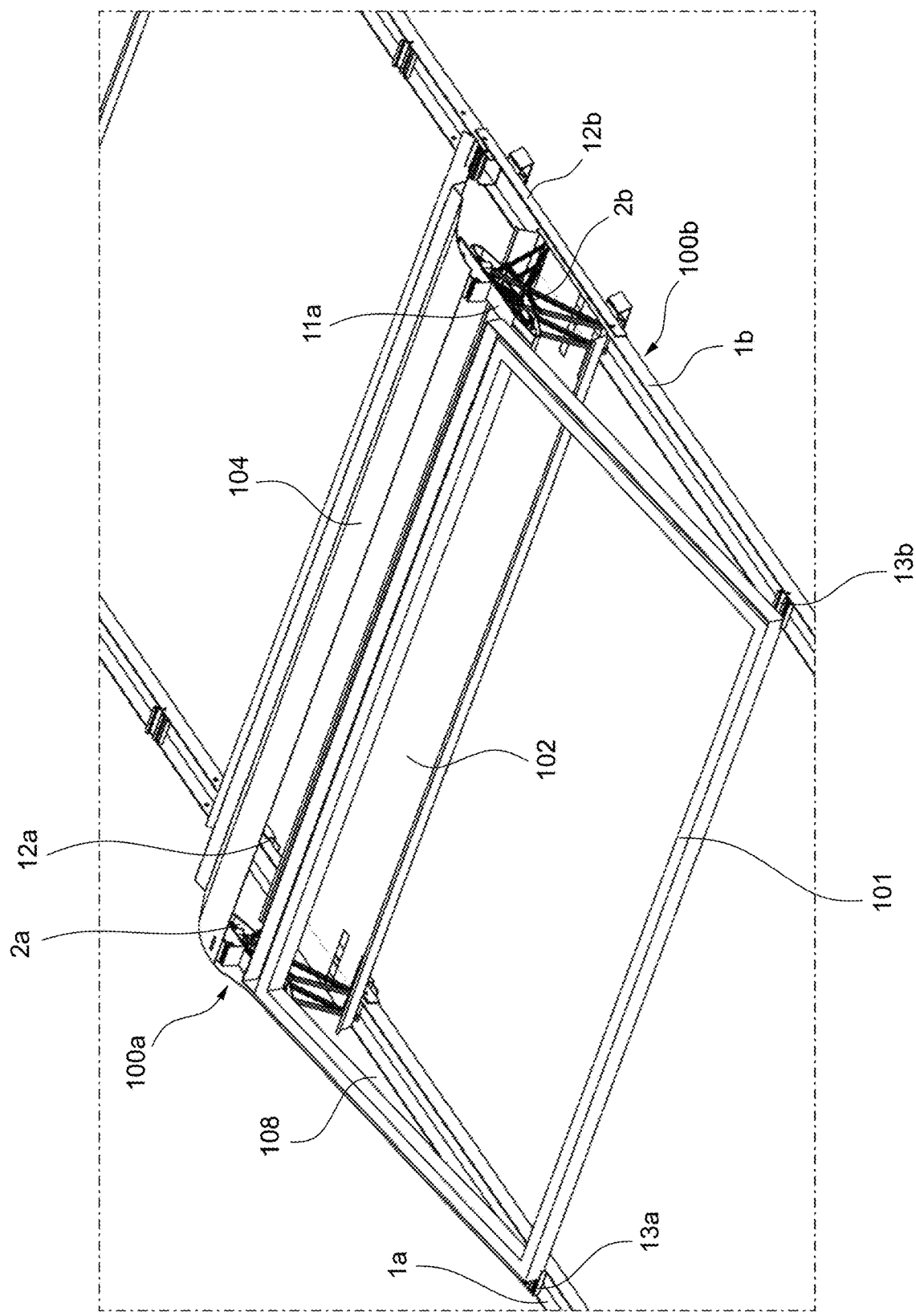
FIG. 5 shows a solar module arrangement in a one-sided 10-degree configuration.

FIG. 5 shows a solar module arrangement. The solar module arrangement comprises two devices 100a, 100b, each of which comprises a base rail 1a, 1b, an upper support 2a, 2b, a lower support 13a, 13b, and a connecting rail serving as a securing rail 12a, 12b for connecting the base rails 1a, 1b to additional base rails for expanding the holding system.

The base rails 1a, 1b of the devices 100a, 100b are oriented in parallel and the upper supports 2a, 2b and the lower supports 13a, 13b are respectively arranged at the same height to one another along the base rails 1a, 1b. A solar module 101, which for better clarity is shown only as a frame in FIG. 5, rests at an upper end on opposite sides on, and is held by, the bearing or support surfaces 11a of the upper supports 2a, 2b. At a lower end, the solar module 101 respectively rests with the opposite sides on, and is held by, the lower supports 13a, 13b. The solar module 101 is therefore held at four support points by means of the solar module arrangement, such that the support may be understood to be punctiform, in contrast to a linear support on the frame of the solar module 101. A four-point holder of the solar module 101 is thus provided with the holding system shown in FIG. 5.

The upper supports 2a, 2b of the devices 100a, 100b are each arranged with the first connecting elements 7a in the second receiving openings 8b, so that the upper supports 2a, 2b have the same height above the base rail 1 and the support surfaces 11a are at an angle with respect to the horizontal of 10 degrees. The solar module 101 is thus oriented in the holding system at an angle of 10 degrees with respect to the horizontal.

Figure 6:
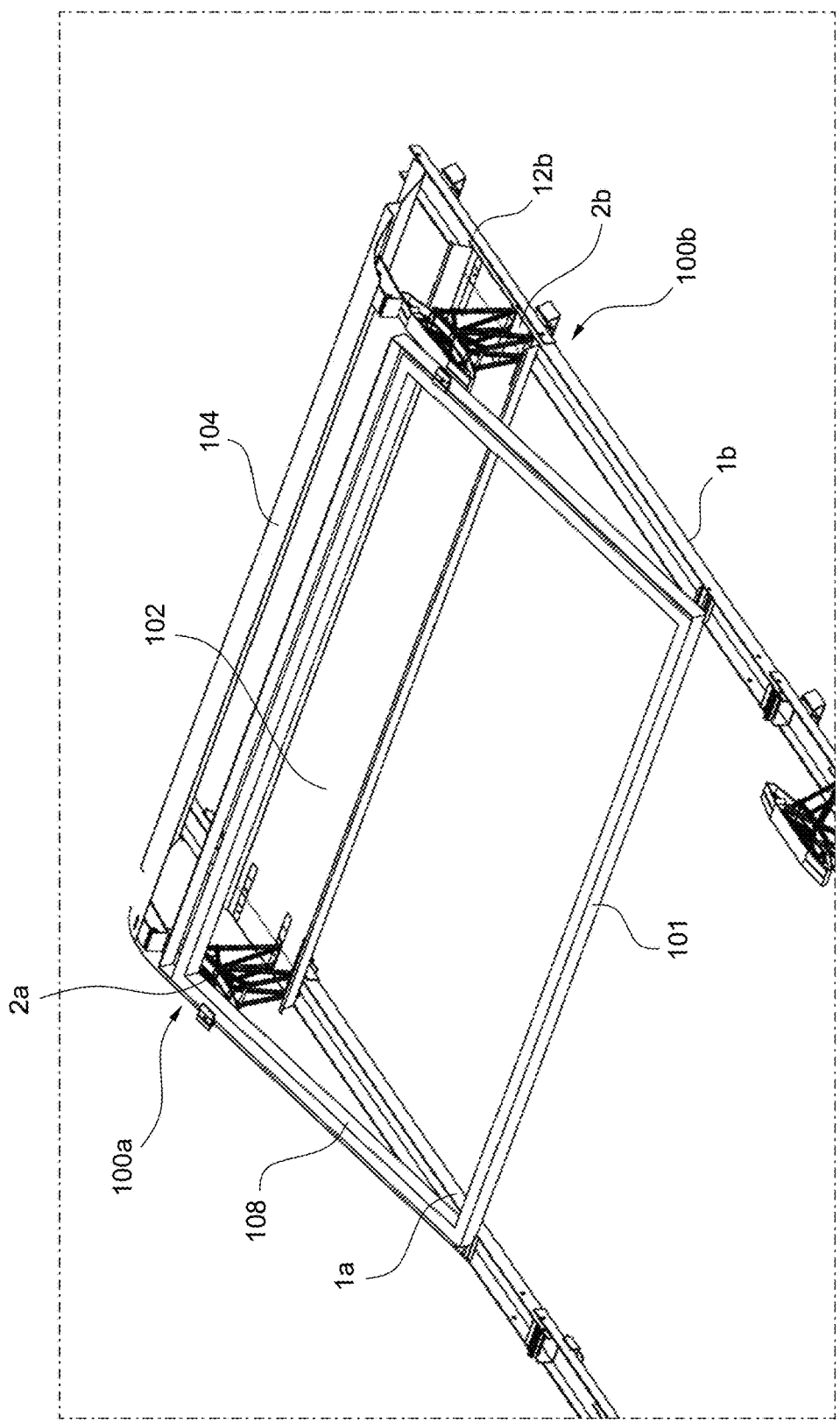
FIG. 6 shows another solar module arrangement in a one-sided 15-degree configuration.

FIG. 6 shows a solar module arrangement in a different configuration. In the solar module arrangement, the upper supports 2a, 2b are each arranged with the first connecting elements 7a in the first receiving openings 8a, so that the upper supports 2a, 2b have the same height above the base rail 1 and the support surfaces 11a are at an angle with respect to the horizontal of 15 degrees. The solar module 101 is thus oriented in the holding system according to FIG. 6 at an angle of 15 degrees with respect to the horizontal.

In alternative configurations, the devices 100a, 100b, in particular the upper supports 2a, 2b, may be designed in such a way that other angles of the solar module 101 may be set. For this purpose, receiving openings and pins 5 as well as bores in which the latter are received may be designed and arranged in such a way that with a corresponding arrangement of the first support elements 3a of the upper supports 2a, 2b, the desired angles of the solar module 101 are set.

A lateral arrangement of a plurality of solar modules 101, each of which is provided in an arrangement according to FIG. 5 or 6, may be provided. In this case, it may be provided that two solar modules 101 arranged next to one another are held next to one another on the same support surface 11a, so that two solar modules are held on the same upper support 2a, 2b.

Figure 7:
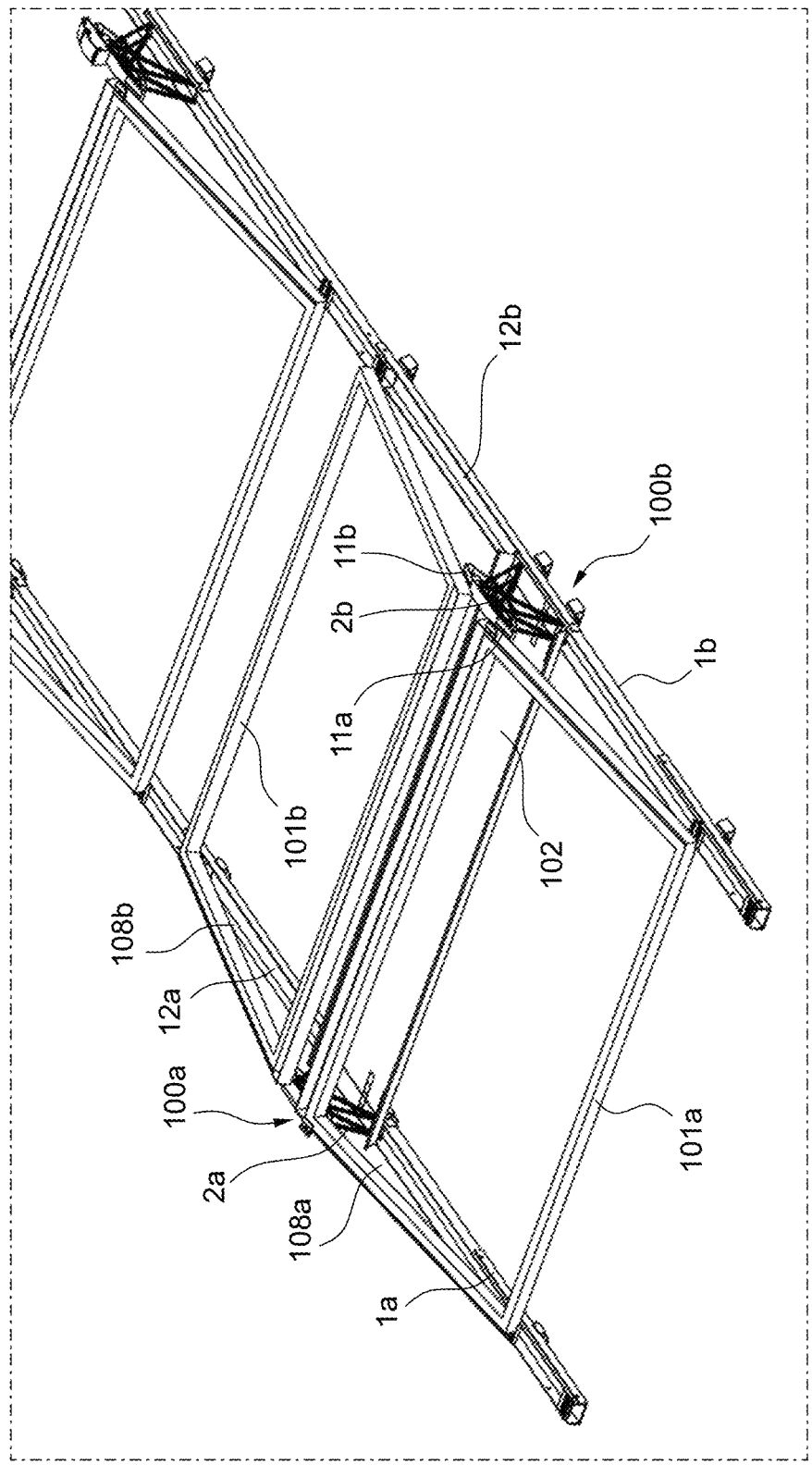
FIG. 7 shows yet another solar module arrangement in a two-sided 10-degree configuration.

FIG. 7 shows a further solar module arrangement in which two solar modules 101a, 101b are arranged one behind the other. In this case, the first solar module 101a rests at an upper end on opposite sides on, and is held by, the support surfaces 11a of the upper supports 2a, 2b. At the lower end thereof, the first solar module 101a respectively rests with the opposite sides on, and is held by, the lower supports 13a, 13b of the devices 100a, 100b. The second solar module 101b lies at an upper end on opposite sides on, and is held by, the support surfaces 11b of the upper supports 2a, 2b. At the lower end thereof, the second solar module 101b respectively rests with the opposite sides on, and is held by, further lower devices, which are otherwise not shown. An arrangement of a plurality of pairs of solar modules 101a, 101b according to FIG. 7 may be provided next to one another. In this case, it may be provided that two solar modules 101a, 101b arranged next to one another are held next to one another on the same support surface 11a, 11b, so that four solar modules are held on the same upper support 2a, 2b.

In the solar module arrangement according to FIG. 7, the upper supports 2a, 2b are each arranged with the first connecting elements 7a in the second receiving openings 8b, so that the upper supports 2a, 2b have the same height above the base rail 1, and the support surfaces 11a, 11b each have an angle to the horizontal of 10 degrees, the support surfaces 11a, 11b being arranged so as to descend in opposite directions. The solar modules 101a, 101b in the solar module arrangement according to FIG. 7 are thus each oriented opposite one another at an angle of 10 degrees with respect to the horizontal and lowered in opposite directions.

Figure 8A:
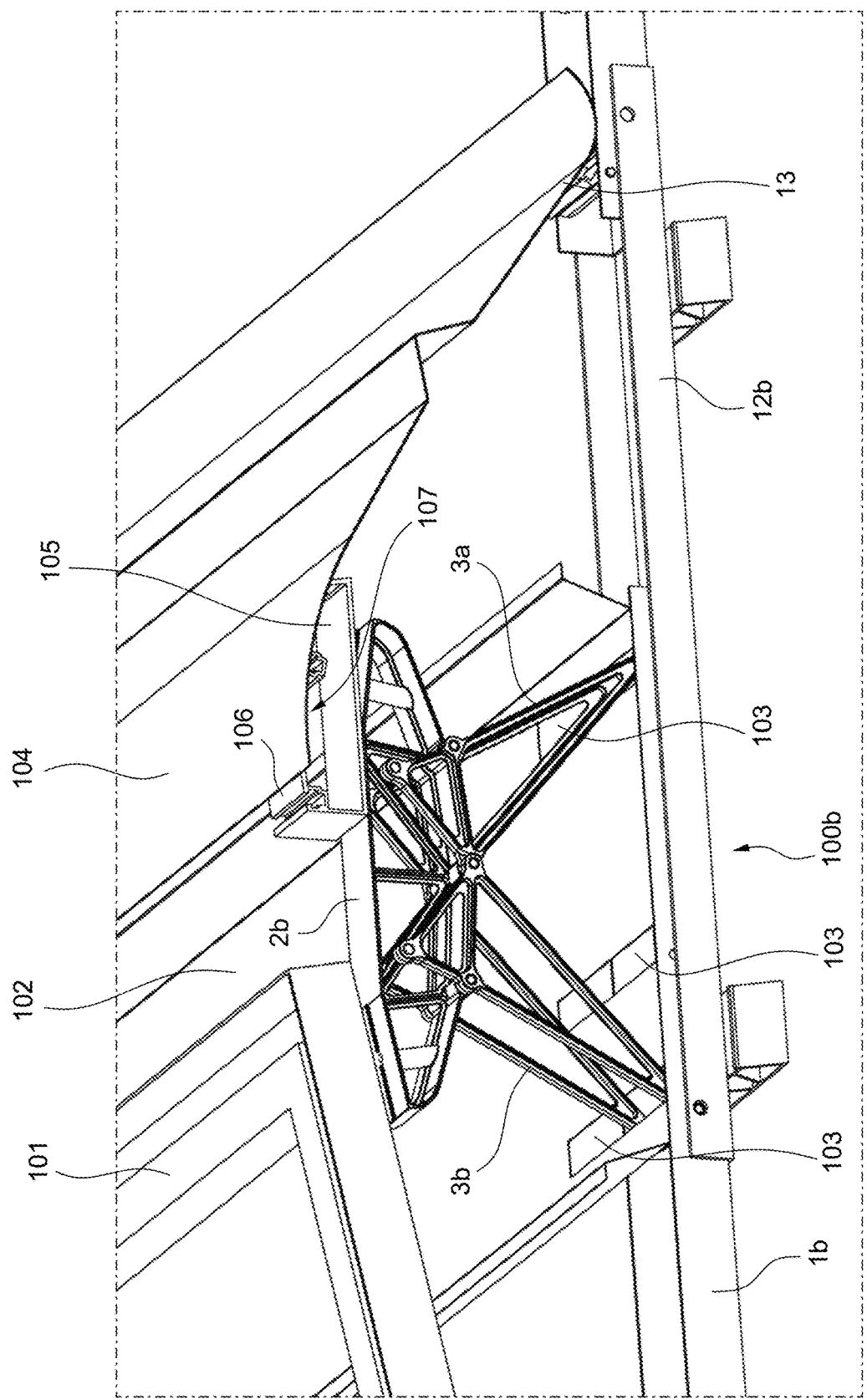
FIG. 8A shows a detailed view of a solar module arrangement.
Figure 8B:
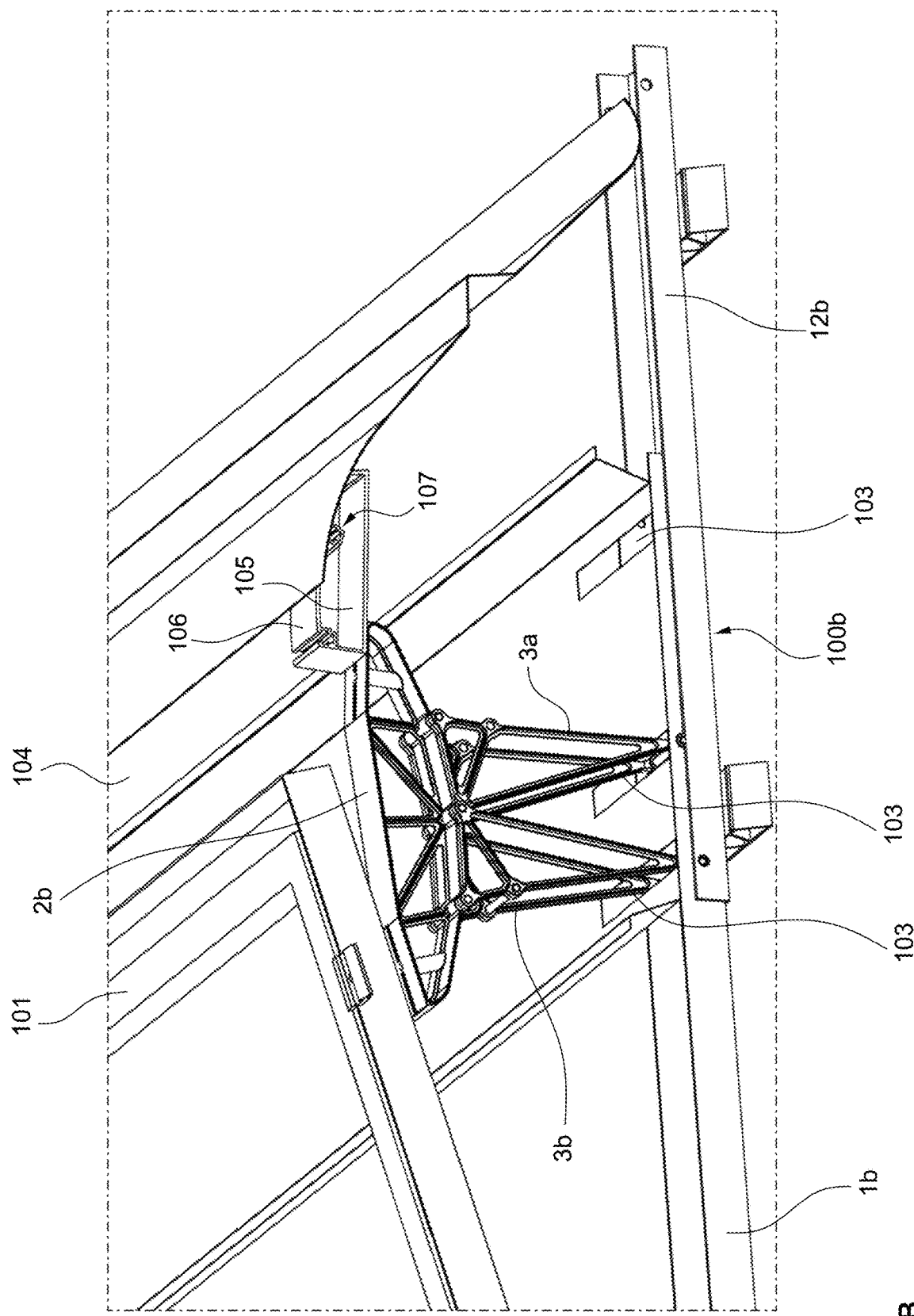
FIG. 8B shows a detailed view of a further solar module arrangement.

The solar module arrangements shown in FIGS. 5, 6, and 7 are configured for mounting solar modules on flat roofs, the disclosed holding systems also being usable for other applications, for example a free-standing mounting of solar modules. In the case of a flat roof mounting, it is not possible in many applications to connect the holding system to the roof. For this reason, and to increase safety in embodiments in which a connection to the flat roof is possible, the holding systems of the solar module arrangements according to the embodiments of FIGS. 5, 6, and 7 have ballast troughs 102, which may be filled with ballast in order to increase the weight of the holding system and thus to prevent movement of the holding system, for example due to the action of wind. The ballast troughs rest on opposite sides in edge areas on the base rails 1a, 1b. As can be seen in particular in the detailed views of FIGS. 8A and 8B, the ballast troughs 102 have openings 103 in the edge regions. The openings 103 are arranged and shaped in such a way that the support elements 3a, 3b in the various arrangements of the connecting elements 7a, 7b in the receiving openings 8a, 8b, 8c are received in the openings 103. This is shown in FIG. 8A for a configuration of the arrangement 100b for a 10-degree orientation of the solar module 101. FIG. 8B shows a corresponding configuration for a 15-degree orientation of the solar module 101.

The shape of the support elements 3a, 3b, in particular, the upward widening thereof and the oblique orientation of the struts of the cast metal parts 4, limit the upward movement of the ballast trough 102. A (complete) lifting of the ballast trough 102 from the base rails 1a, 1b is thus prevented. In this way, the ballast trough 102 is secured to the holding system.

The solar module arrangements shown in FIGS. 5 and 6 also each have a rear wind deflector 104. The rear wind deflector 104 is formed with a shaped metal sheet and prevents wind from flowing from behind under the respective solar module 101 and moving it upward. As shown by way of example in the detailed representations of FIGS. 8A and 8B for different configurations of the upper support 2b, a deflector holder 105 is arranged on the holding device 10 of the upper support 2b. The deflector holder 105 has a support surface 106 which is convexly rounded. The rear wind deflector 104 has a contact surface 107, which is shaped in a concavely rounded manner, adapted to the shape of the support surface 106. The respective shape of the support surface 106 and the contact surface 107 in this case is selected in such a way that the rear wind deflector 104 is merely shifted on the support surface 106 between a high configuration of the upper support 2b and a low configuration of the upper support 2b. This may be seen, in particular, in the comparison of FIGS. 8A and 8B. Due to the shaping of the contact surface 107, the same rear wind deflector 104 is therefore suitable in connection with the deflector holder 105 for use in holding systems or in solar module arrangements with different angular configurations of solar elements, for example, both for a holding system in a 10-degree configuration, as shown by way of example in FIG. 5, as well as for a holding system in a 15-degree configuration, as shown by way of example in FIG. 6.

The upper end of the rear wind deflector 104 is fixed in the desired position on the deflector holder 105 by means of appropriate fastening means or fasteners. For example, the rear wind deflector 104 arranged on the support surface 106 may be screwed to the deflector holder 105 or fixed by means of clamping elements. A lower end of the rear wind deflector 104 may be held by means of a lower support 13. In FIG. 8A, it is shown by way of example that the lower end of the wind deflector 104 is held by a lower support 13 of a further arrangement which is otherwise not shown, and which is arranged behind the arrangement 100b. Alternatively, the lower end of the wind deflector 104 may rest on another element. In FIG. 8B, it is shown by way of example that the rear end of the wind deflector 104 rests on the connecting rail of the arrangement 100b, which serves as a securing rail 12b.

In addition, or as an alternative to a rear wind deflector 104, lateral wind deflectors 108 may be provided in order to prevent wind from flowing from the side under the respective solar module 101 and moving the solar module upward. Such a lateral wind deflector 108 is shown in FIGS. 5 and 6 in the form of a metal sheet on the respective arrangement 100a. According to the embodiment of FIG. 7, two lateral wind deflectors 108a, 108b are provided on the arrangement 100a, which together shield the entire side of the holding system from the wind. For better clarity, no lateral wind deflectors 108 are shown in FIGS. 5, 6, and 7 on the respective arrangement 100b. Corresponding lateral wind deflectors 108 may, however, also be provided for the arrangements 100b according to the embodiments of FIGS. 5, 6, and 7.

Alternatively, or in addition, a front wind deflector (not shown) may be provided on the front side.

The base rails 1, 1a, 1b and/or securing rails 12, 12a, 12b may be designed in the various embodiments as cable routing units, in order to receive and route supply cables for solar modules 101, 101a, 101b. In this case, the cables arranged in the base rails 1, 1a, 1b and/or the securing rails 12, 12a, 12b are protected from external damage by means of a cable routing of this type. A corresponding routing of cables in the base rail 1b and the securing rail 12b is shown by way of example in FIG. 6.

Alternatively, or in addition, a cable routing may be provided on or in the support elements 3a, 3b.

Figure 9:
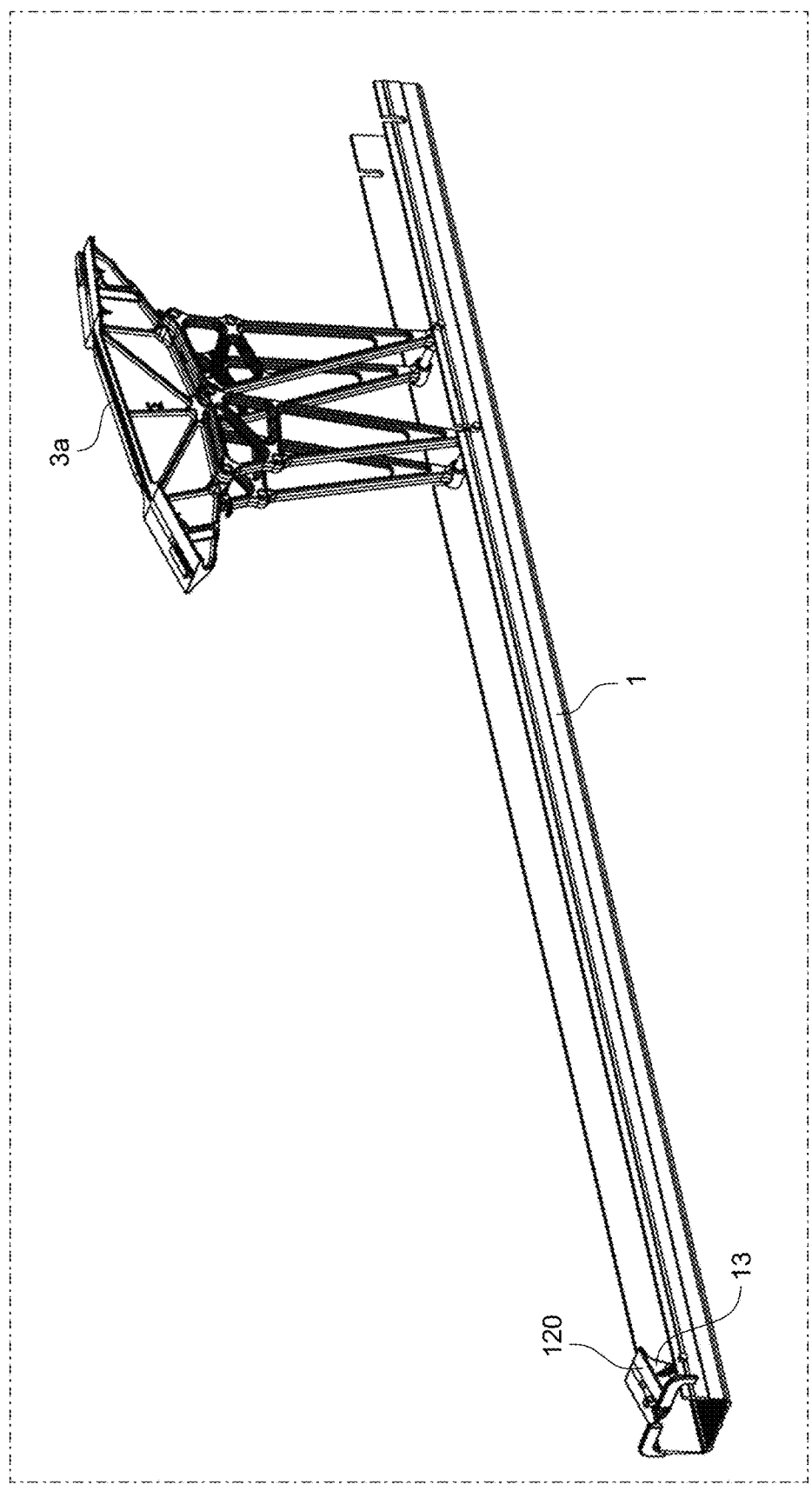
FIG. 9 shows a schematic representation of an arrangement for a device for supporting a solar module with the base rail.

FIG. 9 shows a schematic representation of an arrangement for a device for supporting a solar module with the base rail 1, on which the support element 3a is arranged as part of the upper support. A further embodiment of the lower support 13 having a support component 120 pivotably mounted on the base rail 1 is arranged on the base rail 1. The section of the base rail 1 having the support or holding component 120 is shown enlarged in FIG. 10. The support component 120 provides a support surface or bearing surface 121 for placing the solar module (not shown), a spacer pin 123 being arranged on bearing surfaces 121, 122 formed next to one another, with which spacer pin 123 a stop is formed for the solar modules to be arranged on both sides. The holding component 120 is mounted on the base rail 1 so as to be pivotable about a pivot axis 124, which extends transversely to the longitudinal direction of the base rail 1. In the position shown in FIGS. 9 and 10, retaining claws 125 grasp the base rail 1 on opposite sides and at a distance from the base rail 1, so that the shear rail 12 (not shown) may be pushed into the spacing area between the base rail 1 and the holding claw 125. If the holding component 120 is pivoted about the pivot axis 124, the holding claws 125 may be released from the engagement shown in FIG. 10 (by pivoting upwards). The pivotable mounting of the holding component 120 thus enables a continuous adjustment to different angles of inclination of the solar module.

Figure 10:
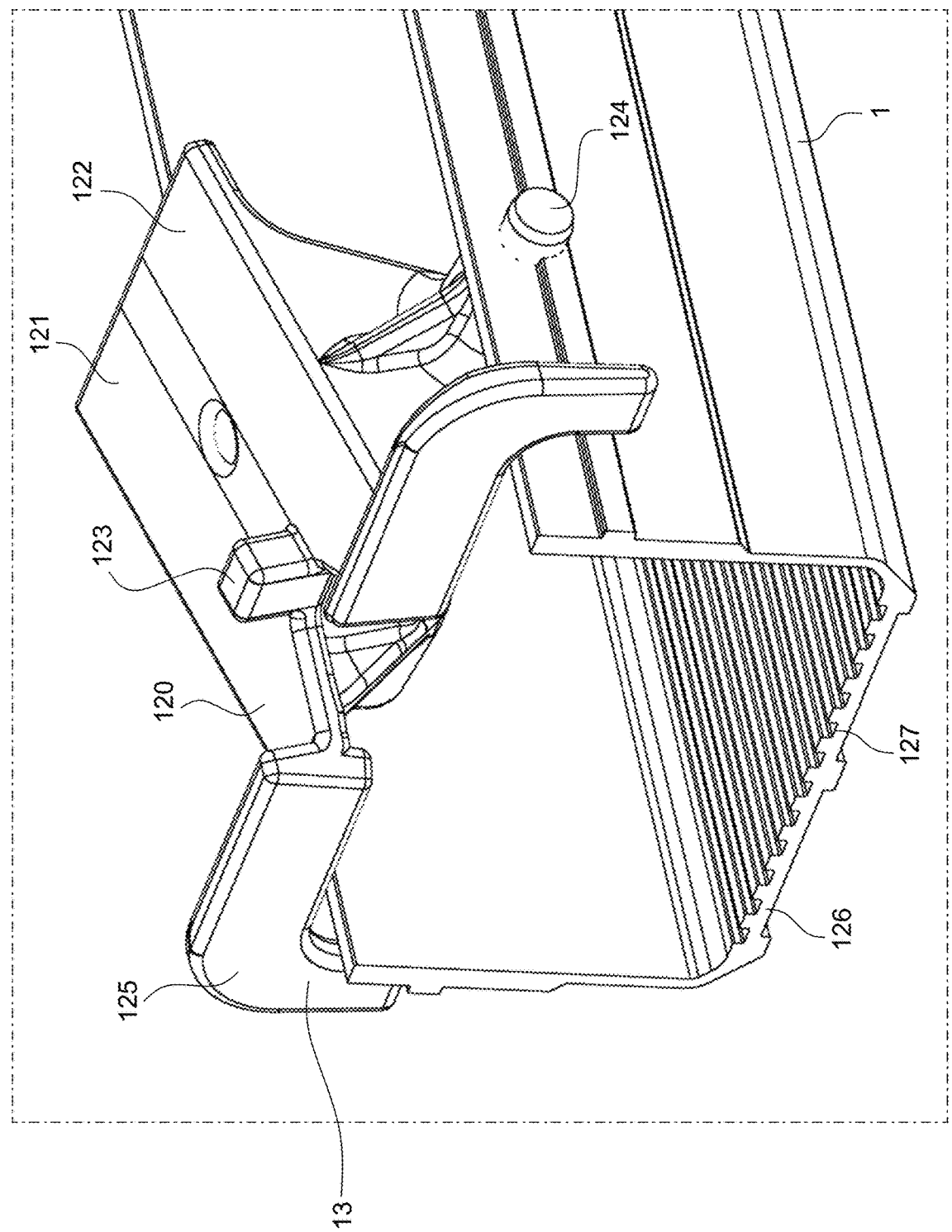
FIG. 10 shows a schematic representation of a portion of the arrangement from FIG. 9 with a support component or holding component.
Figure 11:
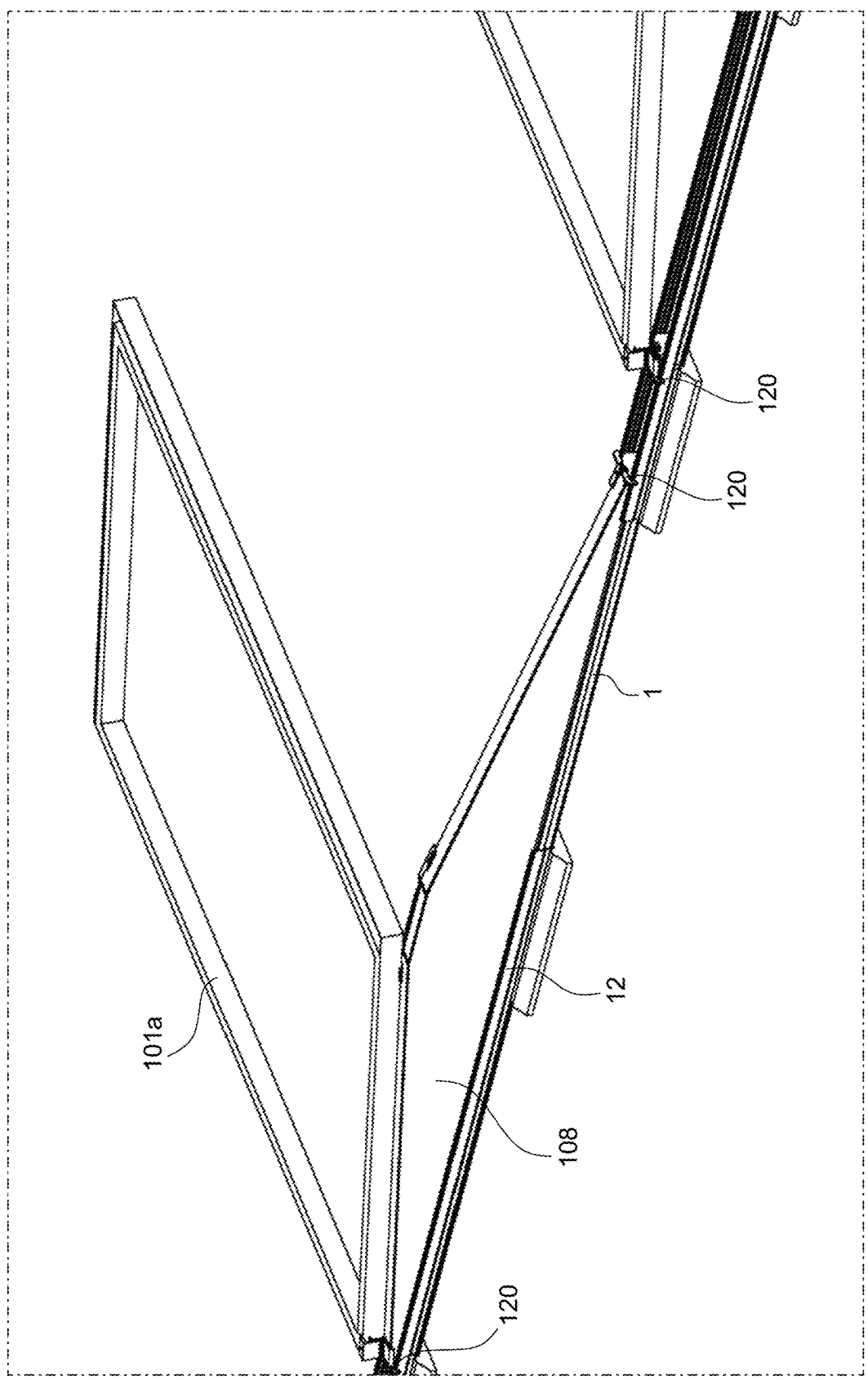
FIG. 11 shows a schematic representation of an arrangement for a device for supporting a solar module having a lateral wind deflector.
Figure 12:
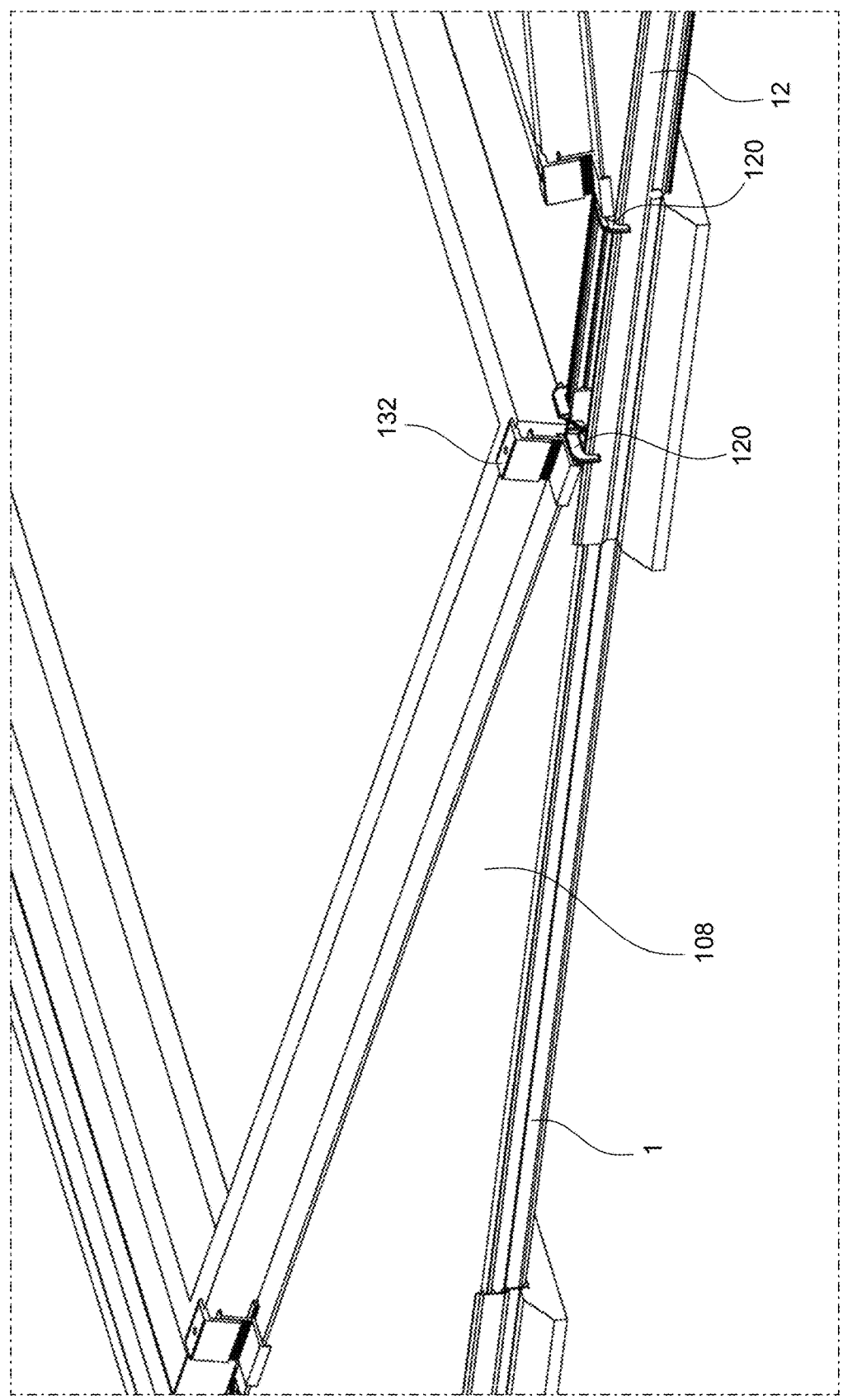
FIG. 12 shows a schematic representation of a portion of the arrangement from FIG. 11.
Figure 13:
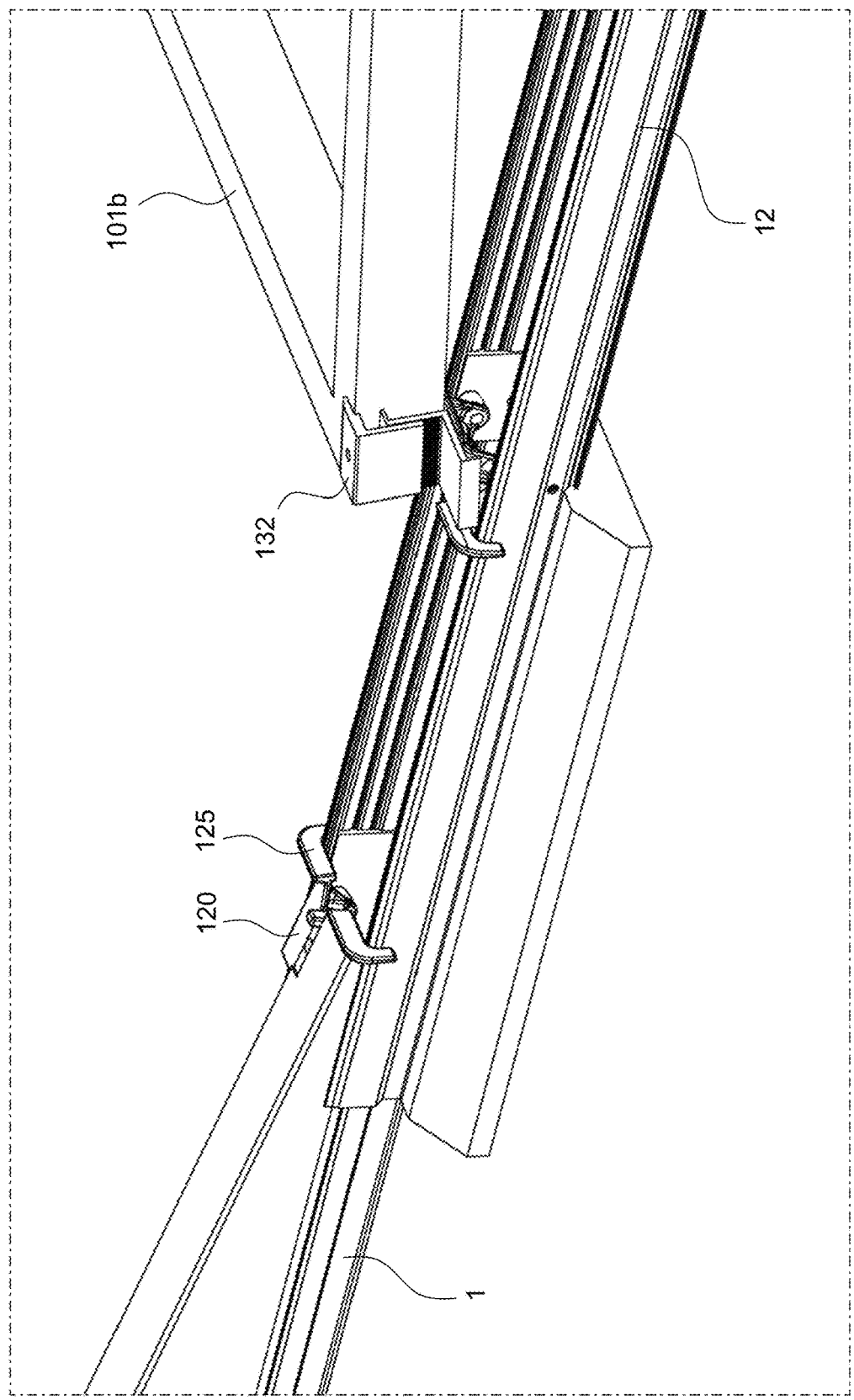
FIG. 13 shows an enlarged schematic representation of the portion of the arrangement from FIG. 12.
Figure 14:
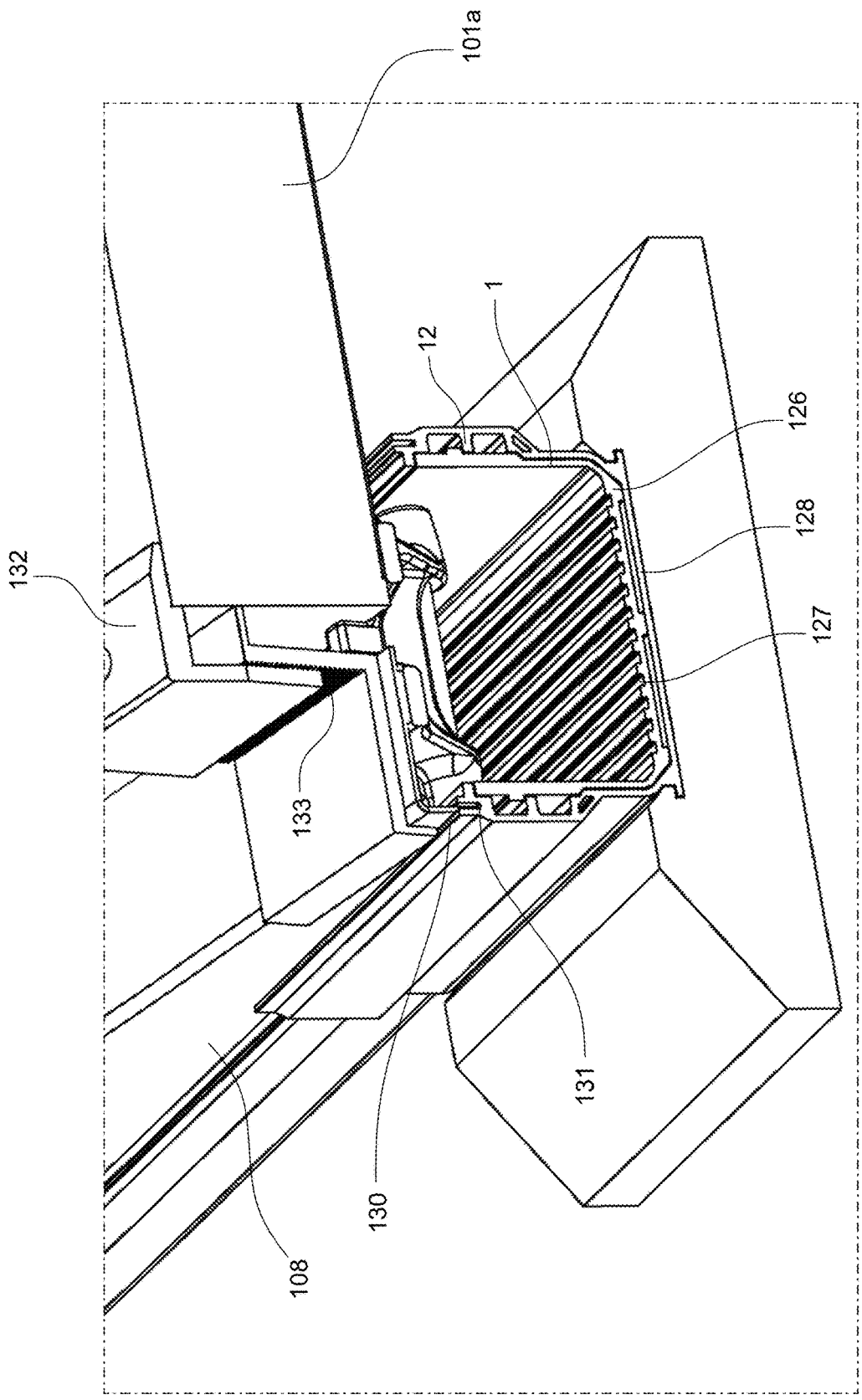
FIG. 14 shows an enlarged schematic representation of the portion of the arrangement from FIG. 13 having a support component or holding component.
Figure 15:
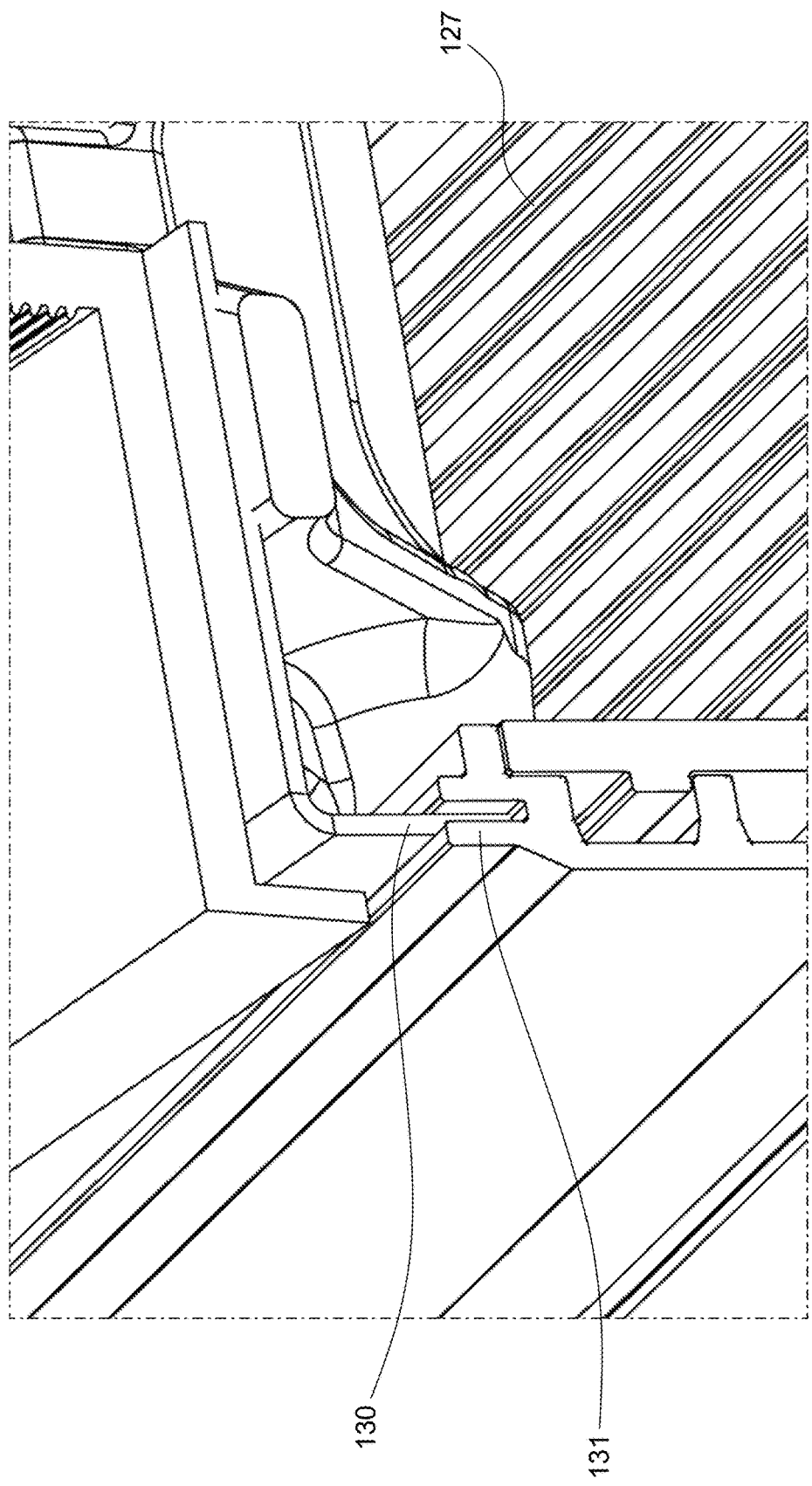
FIG. 15 shows an enlarged schematic representation of the portion of the arrangement from FIG. 14.

According to the representation in FIG. 10, drainage grooves 127 are formed in the bottom area 126 in the longitudinal direction of the base rail 1, which serve to drain water, in particular rainwater (cf. also the detailed representation in FIG. 14). If cables are inserted into the base rail 1, this prevents the cables from lying in the water. The water thus draining from the base rail 1 via the drainage grooves 127 may then reach the securing rail 12 below and be discharged there to the outside to recesses 128 which are formed on the securing rail 12. Drainage channels are formed by means of the recesses 128 and of the base of the securing rail arranged above them.

FIGS. 11 to 15 show an embodiment in which the lateral wind deflector 108 is provided. According to FIGS. 14 and 15, a section 130 of the lateral wind deflector 108 is received in a recess 131 on the securing rail 12 and is thus secured in the mounting position thereof.

The solar module 101a is secured to the holding component 120 by means of a clamping element 132, a screw connection being used as a mechanical securing means or mechanical securement in the embodiment shown. The clamping element 132 may be adjusted by means of assigned latching profiles 133, via which solar modules of different heights or thicknesses are clamped.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A device for supporting solar modules, comprising:
a base rail;
an upper support arranged on the base rail for holding an upper end of a solar module, having a first support element and a second support element; and
a lower support arranged on the base rail for holding a lower end of a solar module, wherein the lower support comprises a support component pivotably mounted on the base rail, the support component having a bearing surface for placing the lower end of the solar module; a spacer pin being arranged on the bearing surface, the spacer pin being a stop for the solar module; and holding claws engaging the base rail; wherein the support component is mounted on the base rail so as to be pivotable about a pivot axis, which extends transversely to the longitudinal direction of the base rail;
wherein:
the first support element and the second support element are movably connected to one another in such a way that the first support element is movable relative to the second support element between a first position and a second position;
the upper support extends up to a first height above the base rail when the first support element is arranged in the first position; and
the upper support extends up to a second height above the base rail, which is different from the first height, when the first support element is arranged in the second position.

2. The device according to claim 1, wherein
the base rail has a first receiving opening and a second receiving opening;
the upper support has a first connection element arranged on the first support element and a second connecting element arranged on the second support element;
the first connecting element is arranged in the first receiving opening when the first support element is in the first position; and
the first connecting element is arranged in the second receiving opening when the first support element is in the second position.

3. The device according to claim 2, having a securing rail which is arranged on the base rail so as to at least partially encompass the base rail and is movable along the base rail between a first position and a second position,
wherein
the securing rail at least partially closes one of the first receiving opening and the second receiving opening in the second position in such a way that a movement of the first connecting element out of the first receiving opening and/or of the second receiving opening is prevented; and
the securing rail unblocks the first receiving opening and the second receiving opening in the first position, in such a way that a movement of the first connecting element out of the first receiving opening and the second receiving opening is made possible.

4. The device according to claim 2, wherein the second connecting element is arranged in a stationary manner in a further receiving opening of the base rail.

5. The device according to claim 1, wherein the upper support may be arranged in a first holding position in which the upper support is configured to hold a solar module at a first angle relative to the base rail, and in a second holding position in which the upper support is configured to hold a solar module at a second angle relative to the base rail which is different from the first angle.

6. The device according to claim 5, wherein the upper support is arranged in the first holding position when the first support element is arranged in the first position, and the upper support is arranged in the second holding position when the first support element is arranged in the second position.

7. The device according to claim 1, wherein the first support element is fixable in the first position and in the second position, respectively, with respect to the second support element.

8. The device according to claim 1, wherein the first support element is movable relative to the second support element into a transport position of the first support element, and the second support element is movable relative to the base rail into a transport position of the second support element in such a way that the upper support is arranged substantially within the base rail when the first support element and the second support element are arranged in the respective transport position.

9. The device according to claim 1, wherein the upper support has a deflector holder, which is configured to hold a wind deflector on the upper support in such a way that the wind deflector is arranged at a first deflector angle relative to the base rail when the first support element is arranged in the first position, and the wind deflector is arranged at a second deflector angle relative to the base rail when the first support element is arranged in the second position.

10. The device according to claim 1, wherein the base rail is configured to receive and route a cable of a solar module.

11. The device according to claim 1, wherein the base rail is configured for arranging one side of a ballast holding device thereon in such a way that the ballast holding device rests at least in sections on the base rail and the upper support is configured to be arranged at least in sections in at least one opening of the ballast holding device when it rests at least in sections on the base rail, the upper support being shaped in such a way that it substantially prevents an upward movement of the ballast holding device in this case.

12. A kit for a device according to claim 1, comprising:
a base rail;
an upper support for holding an upper end of a solar module, having a first support element and a second support element, wherein the first support element and the second support element are movably connected to one another in such a way that the first support element is movable relative to the second support element between a first position and a second position, and
a lower support arranged on the base rail for holding a lower end of a solar module;
wherein the upper support is configured to be arranged on the base rail for manufacturing a device for supporting solar modules and the first support element is configured, in this case
to be arranged in the first position in such a way that the upper support element extends up to a first height above the base rail; and
to be arranged in the second position in such a way that the upper support element extends up to a second height above the base rail, which is different from the first height.

* * * * *